United States Patent
You et al.

(10) Patent No.: US 10,653,984 B2
(45) Date of Patent: May 19, 2020

(54) WATER PURIFYING APPARATUS AND FILTER STRUCTURE

(71) Applicant: LG ELECTRONICS INC., Seoul (KR)

(72) Inventors: Jimin You, Seoul (KR); Siyeon An, Seoul (KR); Uison Hwang, Seoul (KR); Youngjae Kim, Seoul (KR); Gyeonghwan Kweon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/154,533

(22) Filed: Oct. 8, 2018

(65) Prior Publication Data

US 2019/0039003 A1 Feb. 7, 2019

Related U.S. Application Data

(62) Division of application No. 15/439,525, filed on Feb. 22, 2017, now Pat. No. 10,188,972.

(30) Foreign Application Priority Data

Mar. 22, 2016 (KR) .................. 10-2016-0034309

(51) Int. Cl.
  *B01D 35/30* (2006.01)
  *B01D 29/15* (2006.01)
  (Continued)

(52) U.S. Cl.
  CPC .............. *B01D 35/30* (2013.01); *B01D 29/15* (2013.01); *B01D 35/147* (2013.01);
  (Continued)

(58) Field of Classification Search
  CPC ............ B01D 35/30; B01D 2201/4061; B01D 2201/302; B01D 2201/301; B01D 29/15;
  (Continued)

(56) References Cited

U.S. PATENT DOCUMENTS 4,271,020 A 6/1981 Van Meter
7,540,957 B1 6/2009 Kurth et al.
(Continued)

FOREIGN PATENT DOCUMENTS

JP 47-036060 A 11/1972
JP 2006-095510 A 4/2006
(Continued)

*Primary Examiner* — David C Mellon
(74) *Attorney, Agent, or Firm* — Dentons US LLP

(57) ABSTRACT

A water purifying apparatus including a head having a water inlet portion and a water outlet portion; a shaft provided in the head and rotatably mounted between the water inlet portion and the water outlet portion; a bypass flow path passing through a circumference of the shaft, and communicating the water inlet portion with the water outlet portion according to rotation of the shaft; a filter detachably mounted to the head, and having a filter inserting portion in which the shaft is inserted when being mounted on the head; and a filtering flow path in which an inlet port and an outlet port are formed on the circumference of the shaft in a direction intersecting the bypass flow path, and communicated between the filter, the water inlet portion and the water outlet portion with each other according to the rotation of the shaft.

7 Claims, 26 Drawing Sheets

(51) Int. Cl.
*B01D 35/147* (2006.01)
*C02F 1/00* (2006.01)
*F25D 11/02* (2006.01)
*F25D 23/02* (2006.01)
*F25D 23/12* (2006.01)

(52) U.S. Cl.
CPC ............ *B01D 35/306* (2013.01); *C02F 1/001* (2013.01); *F25D 11/02* (2013.01); *F25D 23/028* (2013.01); *F25D 23/126* (2013.01); *B01D 2201/301* (2013.01); *B01D 2201/302* (2013.01); *B01D 2201/347* (2013.01); *B01D 2201/4061* (2013.01); *C02F 2201/006* (2013.01); *C02F 2307/10* (2013.01); *C02F 2307/12* (2013.01); *F25D 2323/021* (2013.01); *F25D 2323/121* (2013.01)

(58) Field of Classification Search
CPC ............... B01D 35/147; B01D 35/306; B01D 2201/347; C02F 1/001; C02F 2201/006; C02F 2307/10; C02F 2307/12; F25D 23/028; F25D 11/02; F25D 23/126; F25D 2323/121; F25D 2323/021
See application file for complete search history.

(56) References Cited

U.S. PATENT DOCUMENTS

| | | | |
|---|---|---|---|
| 9,067,154 B1* | 6/2015 | Branscomb | B01D 35/306 |
| 2010/0170857 A1 | 7/2010 | Williams et al. | |
| 2015/0096932 A1 | 4/2015 | Hou et al. | |
| 2015/0300722 A1 | 10/2015 | Lim et al. | |
| 2017/0072347 A1 | 3/2017 | Schmoll | |

FOREIGN PATENT DOCUMENTS

| | | | |
|---|---|---|---|
| JP | 2007-513761 A | 5/2007 |
| KR | 10-2006-0029491 A | 4/2006 |
| KR | 20-2009-0009470 U | 9/2009 |
| KR | 20-2010-0004628 U | 5/2010 |
| KR | 10-2010-0102048 A | 9/2010 |
| KR | 10-1478965 B1 | 1/2015 |
| KR | 10-2015-0075596 A | 7/2015 |
| KR | 10-2015-0078896 A | 7/2015 |
| KR | 10-2015-0094904 A | 8/2015 |
| KR | 10-2015-0135021 A | 12/2015 |
| WO | 2008/007823 A1 | 1/2008 |
| WO | 2013123657 A | 8/2013 |

* cited by examiner

WATER PURIFYING APPARATUS AND FILTER STRUCTURE

CROSS-REFERENCE TO RELATED APPLICATION

This application is a Divisional of U.S. patent application Ser. No. 15/439,525, filed on Feb. 22, 2017, which claims priority to Korean Patent Application No. 10-2016-0034309, filed on Mar. 22, 2016, all of which are hereby incorporated by reference in their entirety for all purposes as if fully set forth herein.

BACKGROUND

In general, a water purifying apparatus is used to purify water using a filter or a filtering material, and includes an apparatus that purifies water from a water pipe or tank.

A representative example of the water purifying apparatus that supplies drinkable water is a water purifier. Recently, the entire or a portion of such a water purifying apparatus has been provided even in a refrigerator to be supplied with purified water through the refrigerator or make ice using the purified water.

In a refrigerator including the water purifying apparatus, a filter constituting the water purifying apparatus is required to be replaced or inspected as necessary. Accordingly, for this purpose, the filter is detachably installed. The water purifying apparatus is configured to have a bypass flow path which is capable of supplying water even in a state where the filter is separated and then a user can dispense water even during replacement or inspection of the filter.

Korean Patent Laid-Open Publication No. 10-2015-0135021 discloses a head for a water purifying filter having a bypass structure. However, the head has a complicated structure to enable the flow path to be opened and closed by a flow path switching plunger which is supported by an elastic member during attachment and detachment of the filter. Therefore, there is decreased productivity and assembling workability. Additionally, the bypass path of the flow path is complicated due to the structure of the flow path switching plunger which is slid, thereby deteriorating the flow performance of water. Furthermore, the flow path is not capable of being switched when the performance of the elastic member is deteriorated or the elastic member is abnormal.

SUMMARY

The disclosed embodiments provide a water purifying apparatus which is capable of continuously supplying water by a bypass flow path being switched according to attachment and detachment of a filter.

The disclosed embodiments provide a water purifying apparatus which has a simple bypass flow path switching structure and thus is improved in productivity and assembling workability.

The disclosed embodiments provide a water purifying apparatus in which a bypass flow path is capable of being switched by rotation mounting of a filter.

The disclosed embodiments provide a water purifying apparatus which is easy the attachment and the detachment of the filter.

The disclosed embodiments provide a water purifying apparatus in which the flow of water is capable of being smoothly performed when the bypass flow path is converted by the attachment and the detachment of the filter.

According to one embodiment of the invention, a water purifying apparatus includes a head on which a water inlet portion and a water outlet portion are formed to face each other in a straight line; a mounting member on which a rotation supporting portion is formed to surround the water inlet portion and the water outlet portion of the head; a water inlet pipe and a water outlet pipe which are connected to the mounting member; a shaft provided in the head and rotatably mounted between the water inlet portion and the water outlet portion; a bypass flow path formed to pass through a circumference of the shaft, having a flow path projecting portion on a penetrated flow path, and communicating the water inlet portion with the water outlet portion according to rotation of the shaft; a filter detachably mounted to the head, and having a filter inserting portion in which the shaft is inserted when being mounted on the head; and a filtering flow path in which an inlet port and an outlet port are formed on the circumference of the shaft in a direction intersecting the bypass flow path, and which communicates between the filter, the water inlet portion and the water outlet portion with each other according to the rotation of the shaft.

According to another embodiment of the invention, a water purifying apparatus includes a head on which a water inlet portion and a water outlet portion are formed; a shaft provided in the head and rotatably mounted between the water inlet portion and the water outlet portion; a bypass flow path formed to pass through a circumference of the shaft and communicating the water inlet portion with the water outlet portion according to rotation of the shaft; a filtering flow path formed in the shaft in a direction intersecting the bypass flow path; an inner pipe formed to extend downward from the shaft and having a pipe cutout portion on an end thereof; a filter detachably mounted to the head and having a filter inserting portion in which the shaft is inserted when being mounted on the head; and a first connecting portion formed on a supporter extending portion which extends in a direction of the shaft in the filter insertion portion, to rotate the shaft upon rotatably coupling of the filter by coupling with the pipe cutout portion.

According to another embodiment of the invention, a water purifying apparatus includes a head on which a water inlet portion and a water outlet portion are formed; a shaft provided in the head, and rotatably mounted between the water inlet portion and the water outlet portion; a bypass flow path formed to pass through a circumference of the shaft and communicating the water inlet portion with the water outlet portion according to rotation of the shaft; a filtering flow path formed in the shaft to be separated from the bypass flow path; an inner pipe formed to extend downward from the shaft and having a pipe cutout portion on an end thereof and connected to the filtering flow path; a filter detachably mounted to the head and having a filter inserting portion in which the shaft is inserted when being mounted on the head; a supporter extending portion forming a first filter inlet flow path which is connected to the inner pipe and provided in the filter; and a first connecting portion formed on an upper portion of the supporter extending portion to rotate the shaft upon rotatably coupling of the filter by coupling with the pipe cutout portion.

According to another embodiment of the invention, a filter structure includes a housing body formed in a cylindrical shape to have a first accommodating space and having an upper opening portion; a housing cap coupled to the upper opening portion of the housing body by a portion thereof being formed in a cylindrical shape to have a second accommodating space, wherein a coupling projection and an upper opening portion are formed on an outer circumferential surface thereof, and a housing fastening portion is formed on an inner circumferential surface thereof; a filtering member having a cylindrical shape accommodated in the first accommodating space; and an upper supporter coupled to an upper portion of the filtering member and an inner surface of the housing cap respectively, and accommodated in the second accommodating space.

The upper supporter includes a supporter accommodating portion coupled to the upper portion of the filtering member; a supporter stepped portion integrally formed on an upper portion of the supporter accommodating portion and in which a second filter inlet flow path is formed on the outer circumferential surface thereof so that water is supplied in a space between the outer circumferential surface of the filtering member and the housing body; a supporter extending portion which extends upward from the supporter stepped portion, in which a first filter inlet flow path which communicates with a second filter inlet flow path is formed on a center portion thereof, in which a pair of projecting portions are formed to be extend on the upper portion of the first filter inlet flow path and in which a filter outlet flow path is formed on an outside of the first filter inlet flow path; and a supporter fastening portion which prevents a rotation of the upper supporter in the housing cap by being coupled to the housing fastening portion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Figure 1:
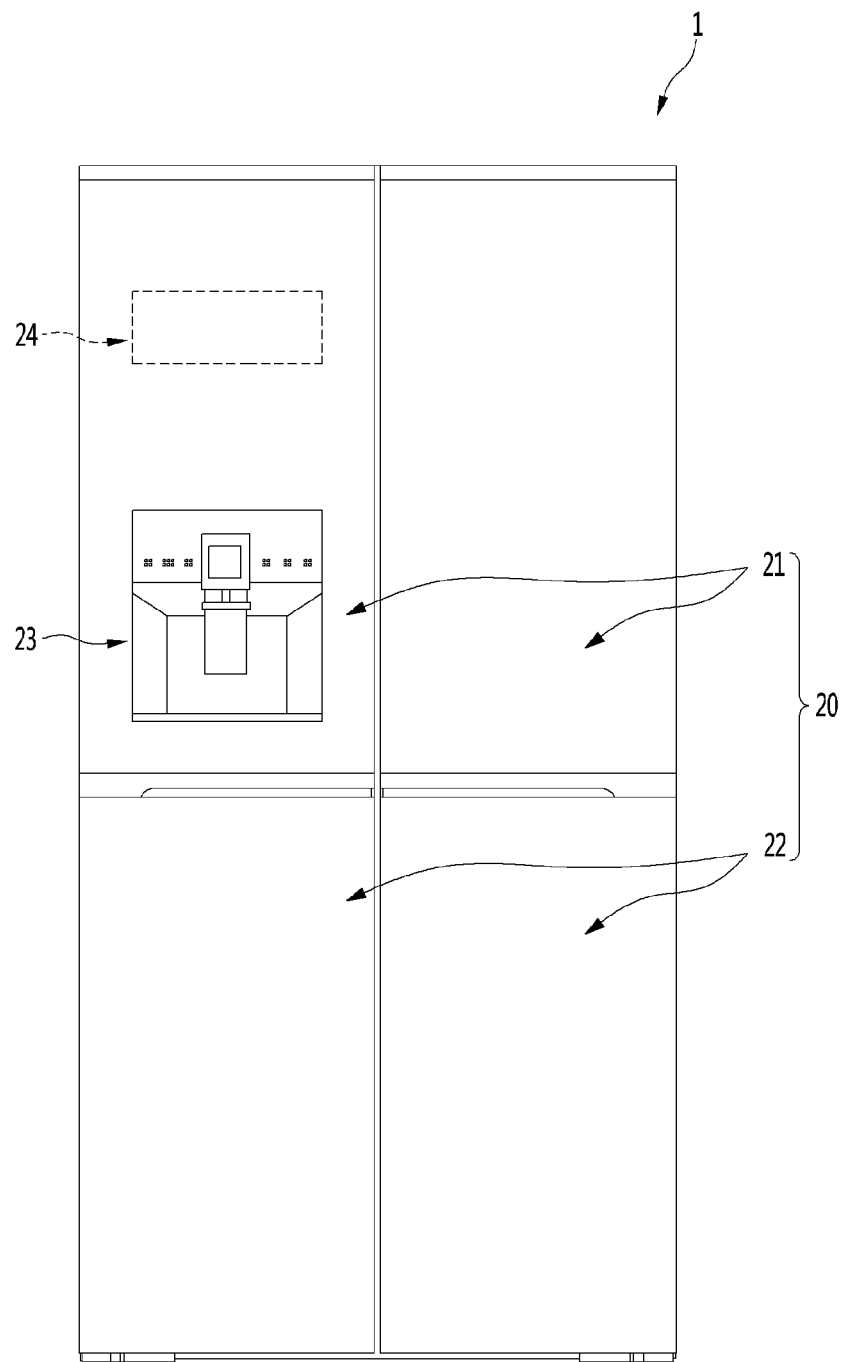
FIG. 1 is a front view illustrating a refrigerator according to an embodiment of the invention.

Hereinafter, some embodiments of the present disclosure will be described in detail with reference to the exemplary drawings. In the following description, the same elements will be designated by the same reference numerals although they are shown in different drawings. Further, in the following description of embodiments of the present disclosure, a detailed description of known functions and configurations incorporated herein will be omitted when it may make the subject matter of the present disclosure rather unclear.

Figure 2:
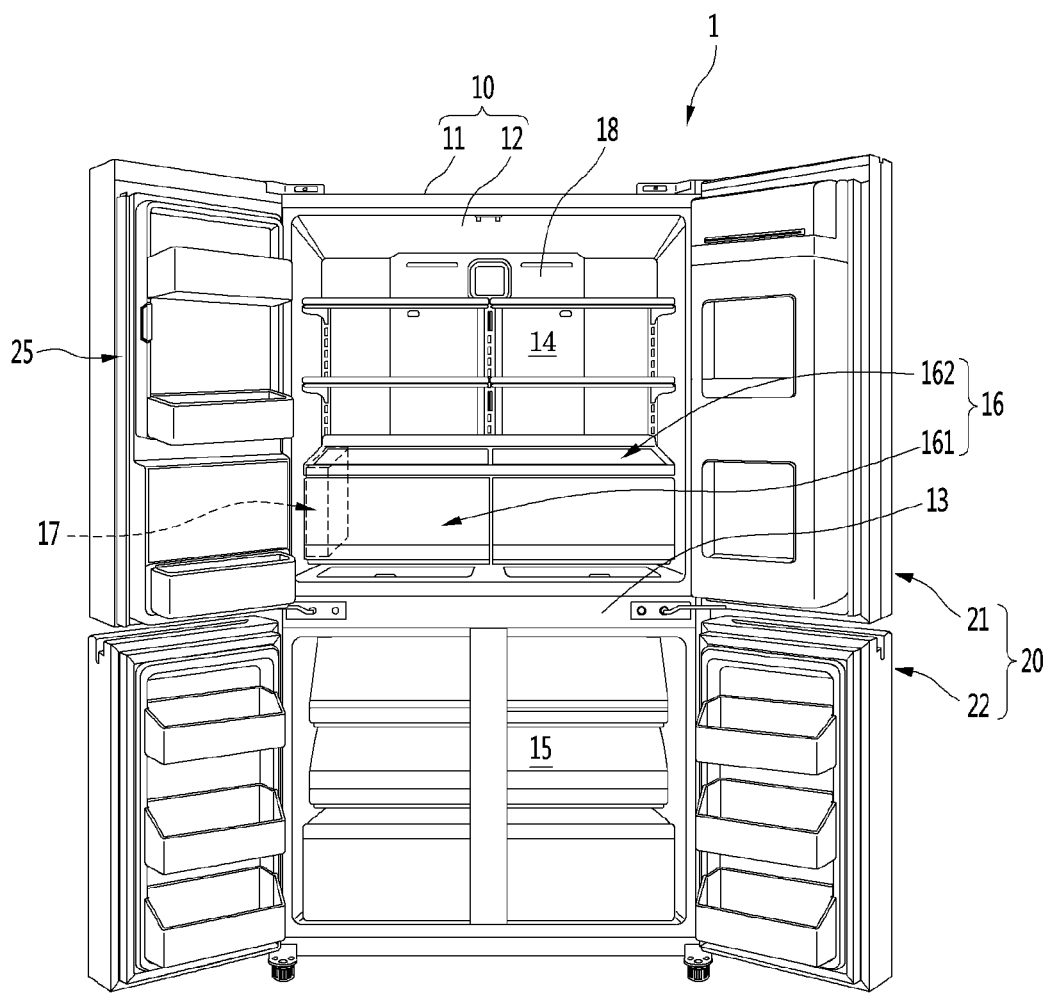
FIG. 2 is a front view illustrating a state where a door of the refrigerator is opened according to an embodiment of the invention.

FIG. 1 is a front view illustrating a refrigerator according to an embodiment of the invention. FIG. 2 is a front view illustrating a state where a door of the refrigerator of FIG. 1 is opened.

With reference to FIGS. 1 and 2, an outer appearance of a refrigerator 1 which includes a water purifying apparatus may be formed by a cabinet 10 that forms a storage space, and a door 10 that opens and closes the storage space of the cabinet 10.

The cabinet 10 may include an outer case 11 made of a metal material (not limited thereto) forming the outer surface and an inner case 12 made of a resin material (not limited thereto), which is coupled with the outer case 11 and forming a storage space in an inside portion of the refrigerator 1. Insulation material may be provided between the outer case 11 and the inner case 12 to insulate the space in the inside of the refrigerator 1.

The storage space may be separated in a vertical direction. The separation may be formed by a barrier 13. Accordingly, the storage space may include an upper refrigerating compartment 14 and a lower freezing compartment 15. The freezing compartment 15 may be further separated in a lateral direction. It will be apparent that the storage space may be divided into left and right compartments based on the barrier 13, and is not limited to any particular configuration.

The door 20 may include a refrigerating compartment door 21 and a freezing compartment door 22, which independently open and close the refrigerating compartment 14 and the freezing compartment 15, respectively.

Both of the refrigerating compartment door 21 and the freezing compartment door 22 may open and close the refrigerating compartment 14 and the freezing compartment 15 by rotation thereof. For this, each of the refrigerating compartment door 21 and the freezing compartment door 22 may be rotatably connected to the cabinet 10 by a door hinge 26 (see FIG. 3). In addition, the refrigerating compartment door 21 may be configured as a French type door configured such that a pair of doors independently rotate at both left and right sides.

A dispenser 23 and an ice maker 24 may be provided at one of the pair of refrigerating compartment doors 21.

The dispenser 23 may be provided at a front surface of the refrigerating compartment door 21, and enable a user to dispense water or ice by manipulating the dispenser 23 from the outside. An ice making compartment 25 may be provided above the dispenser 23.

The ice making compartment 25 is a heat insulating space in which ice is made and stored. The ice maker 24 may be accommodated in inside the ice making compartment. The ice making compartment 25 may be opened/closed by a separate door. Although not shown in the drawings, the ice making compartment 25 may communicate with the freezing compartment 15 by a cool air duct in a state in which the refrigerating compartment door 21 is closed, and may receive cool air necessary for the ice making from a freezing compartment evaporator (not shown).

A plurality of shelves and drawers for storing food may be provided inside the refrigerating compartment 14. For example, as shown in FIG. 2, a drawer assembly 16 may be provided at a bottom surface of the refrigerating compartment 14. The drawer assembly 16 may include a drawer 161 that is slidable and a cover 162 that shields a top surface of the drawer 161.

The drawer assembly 16 may be configured such that the inside thereof is visible therethrough, and a main water tank 34 (see FIG. 3) provided at a rear side of the refrigerating compartment 14 may be shielded by the drawer 161.

A water purifying apparatus 17 may be provided at a side of the drawer assembly 16 for purifying water to be supplied and then supplying the purified water to the dispenser 23 and the ice maker 24. The water purifying apparatus 17 may be disposed between the accommodating space and the wall surface of the drawer 161 and may be shielded by a front surface of the drawer 161. Therefore, in a state where the drawer 161 is closed, the water purifying apparatus 17 is not exposed to the outside, and in a state where the drawer 161 is withdrawn, the water purifying apparatus is exposed to the outside thus providing access to the water purifying apparatus 17. It is understood that the mounting position of the water purifying apparatus 17 is not limited to one side of the drawer 161 and may be provided in the region of the refrigerating compartment 14 including the refrigerating compartment 14 or the refrigerating compartment door 21.

A plurality of shelves having a cantilever structure may be detachably provided above the drawer assembly 16 such that their heights are respectively adjustable. A main duct 18 may be provided at a rear surface of the refrigerating compartment 14 and cool air generated from an evaporator (not shown) may be supplied to the inside portion of the refrigerating compartment 14 through a plurality of discharging ports which are formed in a main duct 18.

Figure 3:
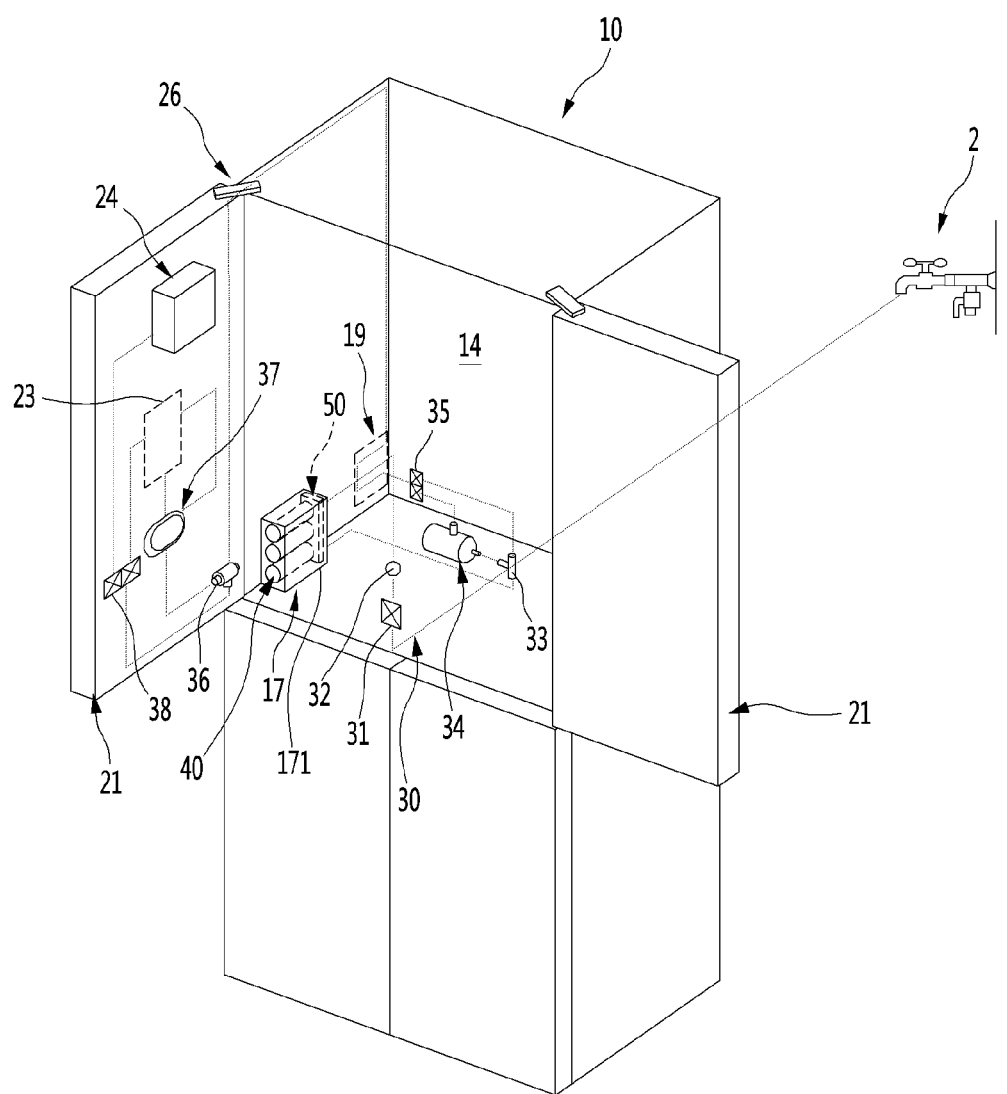
FIG. 3 is a view schematically illustrating a disposition structure of a water supplying flow path of the refrigerator according to an embodiment of the invention.

FIG. 3 is a view schematically illustrating a disposition structure of a water supplying flow path of the refrigerator according to an embodiment of the invention.

As shown in FIG. 3, the refrigerator 1 may include a water supplying flow path 30 that purifies or cools water being supplied from an external water supply source and then dispenses water from the dispenser 23, or supplies the purified water to the dispenser 23 or the icemaker 24.

The water supplying flow path 30 may be directly connected to a water supply source 2, such as a water supply pipe, at the outside of the refrigerator, and be introduced into a space of the refrigerator through a tube guide 19 mounted in the cabinet 10 to be connected to an inlet portion of the water purifying apparatus 17 in the refrigerator.

The water supplying flow path 30 may include a water supply valve 31 and a flow rate sensor 32. The flow rate sensor 32 may be integrally formed with the water supply valve 31.

The water supplying flow path 30 may connect the water purifying apparatus 17 and a first branch pipe 33 with each other. The water supplying flow paths 30 branched from the first branch pipe 33 may be connected to the main water tank 34 and a first branch valve 35, respectively.

The water supplying flow path 30 which is connected to an outlet portion of the first branch valve 35 may extend along an upper surface after extending along a side wall of the inside of the cabinet 10 or a rear wall surface of the outside of the cabinet 10 through the tube guide 19 and may be introduced into the refrigerating compartment door 21 via the door hinge 26.

The water supplying flow path of the refrigerating compartment door 21 may be branched by a second branch pipe 36 and connected to an inlet portion of a sub water tank 37 and a second branch valve 38. The sub water tank 37 may be connected to the dispenser 23 so that cooled water is capable of dispensed through the dispenser 23.

An outlet portion of the second branch valve 38 may be respectively connected to the dispenser 23 and the ice maker 24 by the water supplying flow path 30 to be capable of supplying purified water to the dispenser 23 and the ice maker 24.

The water purified through the water purifying apparatus 17 may be cooled and then supplied to the dispenser 23 or may be supplied to the dispenser 23 or the ice maker 24 in a state in which the water is purified but not cooled.

The water purifying apparatus 17 may include a plurality of filters 40 for purifying supplied water and a head unit 50 to which the plurality of filters 40 are coupled and which is connected a flow path through which water flows. The water purifying apparatus 17 may include a case 171 that accommodates the filters 40 and the head unit 50.

Figure 4:
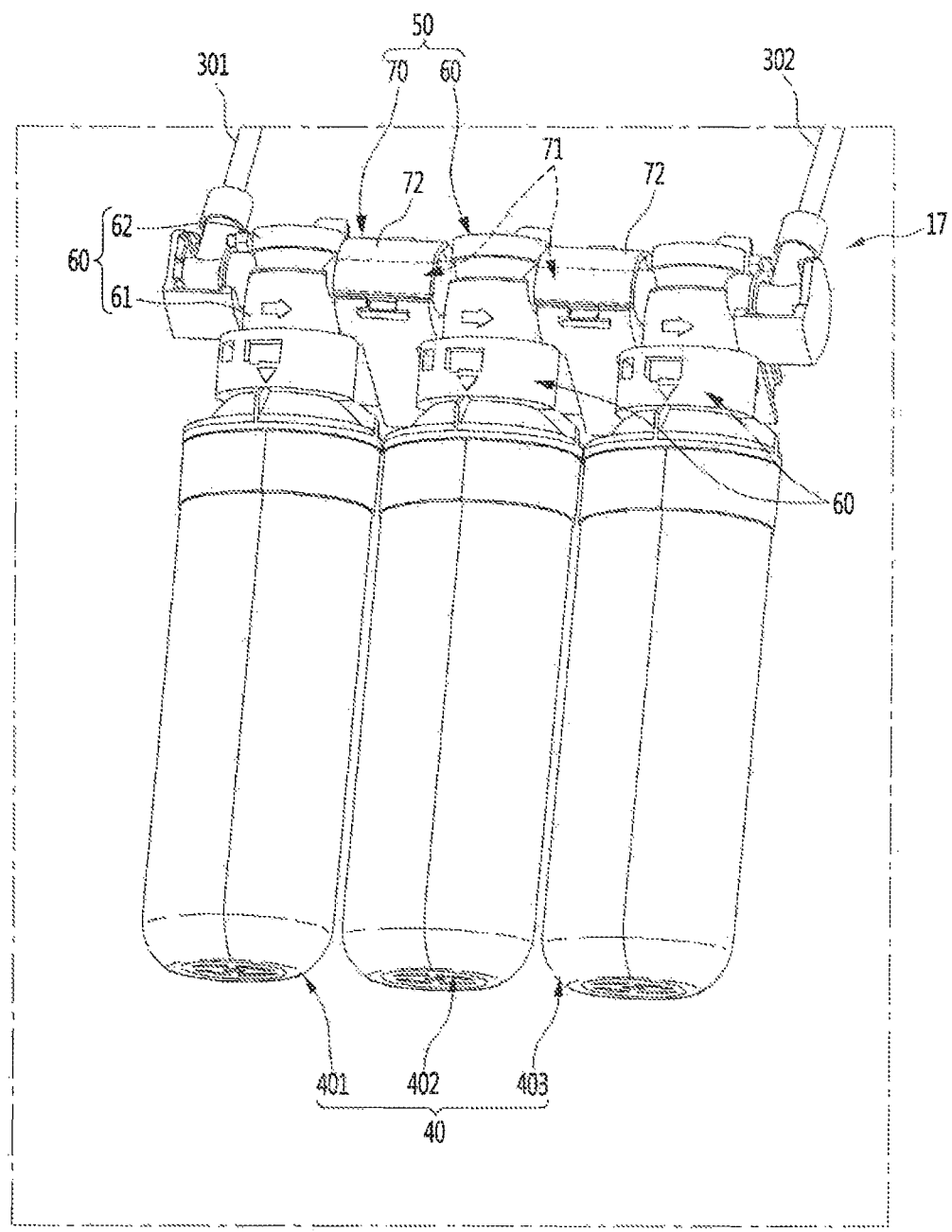
FIG. 4 is a perspective view illustrating the structure of the water purifying apparatus according to an embodiment of the invention.

FIG. 4 is a perspective view illustrating the structure of the water purifying apparatus according to an embodiment of the invention.

As shown in FIG. 4, the water purifying apparatus 17 may include a plurality of filters 40 and a head unit 50.

The plurality of filters 40 may include a first filter 401 which is connected to a water inlet side of the head unit 50, a third filter 403 which is connected to a water outlet side of the head unit 50, and a second filter 402 disposed between the first filter 401 and the third filter 403 and thus is capable of purifying water. The first filter 401 may be a pre-carbon filter, the second filter 402 may be a membrane filter, and the third filter 403 may be a post-carbon filter.

It is understood that the invention is not limited to the number and types of the filters 40, and the number which is capable of being accommodated in the inside of the water purifying apparatus 17 and different types of functional filters from each other for effectively purifying water may be applied.

The head unit 50 may include a plurality of heads 60 to which each of the filters 40 is coupled and a mounting member 70 on which the head 60 is rotatably seated.

A water inlet pipe 301 for supplying original water is capable of being connected to one end of the mounting member 70, and a water outlet pipe 302 for discharging purified water is capable of being connected to the other end thereof.

Each of the plurality of heads 60 may be independently rotated in a state where the plurality of heads 60 are mounted on the mounting member 70. The flow paths of the plurality of heads 60 are capable of being connected to each other by connecting pipes 71 and the original water which flows in through the water inlet pipe 301 is purified after passing through each of the filters 40 and then may be flows out from the water outlet pipe 302.

Each of the connecting pipes 71 may be mounted on the mounting member 70 and is provided between adjacent two heads 60 to each other to allow water to flow between each of the heads 60. A cover 72 may be mounted on one side of the mounting member 70 which corresponds to the connecting pipe 71 to shield the connecting pipe 71.

The head 60 may include a head body 61 to which an upper end of the filter 40 is inserted and then fixed, and a shaft (90 in FIG. 6) connected to the upper end of the filter 40 in the inside portion of the head body 61 and thus forms a flow path through which water flows. The head 50 may further include a head cap 62 for shielding an upper surface of the head body 61 into which the shaft 90 may be inserted.

The filter 40 may be fixedly mounted to the head 60 in a rotatable manner. The shaft 90 may be connected to the filter 40 to form a flow path in a process of the filter 40 being mounted and when the filter 40 is rotated, the shaft 90 is rotated along with the filter 40 so that the flow path of the shaft 90 is capable of being switched.

For example, in a case where the filter 40 is mounted, the flow path may be switched to the filter 40 side by the shaft 90 so that the water is capable of being purified through the filter 40. In a case where the filter 40 is separated, the supplying water is capable of being bypassed without passing through the filter 40, and thus the flow path is capable of being switched so that water passes through the head 60. The switching and detailed structure of the flow path will be described in more detail in the following other embodiments.

The case 171 may have various structures which can accommodate the filter 40 and the head unit 50. The case 171 is capable of fully accommodating the filter 40 and the head unit 50. Alternatively, the case 171 may accommodate a portion of the filter 40 and/or the head unit 50.

The case 171 may have a structure which is capable of being fixedly mounted at one side of the inside portion of the refrigerating compartment 14. Alternatively, the case 171 may not be provided and the mounting member 70 may be directly mounted to a side of the inner portion of the refrigerating compartment 14.

Only one filter 40 may be provided according to the function of the water purifying apparatus 17. In such case where only one filter 40 is provided, one head unit 50 and one mounting member 70 may be provided. The structure of the head 60 may have the same structure irrespective of whether there is just one head 60 or there are a plurality of the heads 60. Hereinafter, a water purifying apparatus having one filter 40 and one head 60 will be described.

Figure 5:
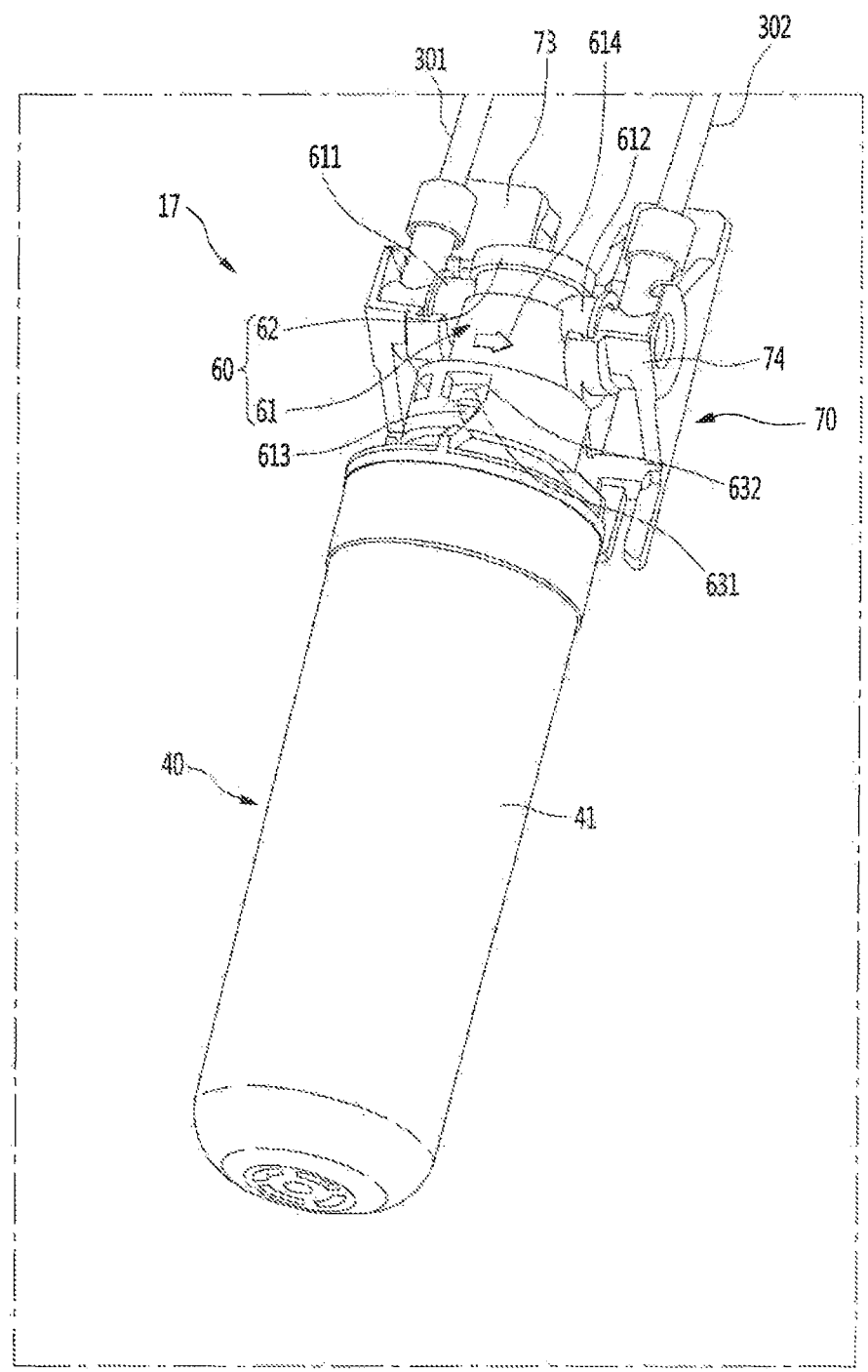
FIG. 5 is a perspective view illustrating a structure of a water purifying apparatus according to another embodiment of the invention.
Figure 6:
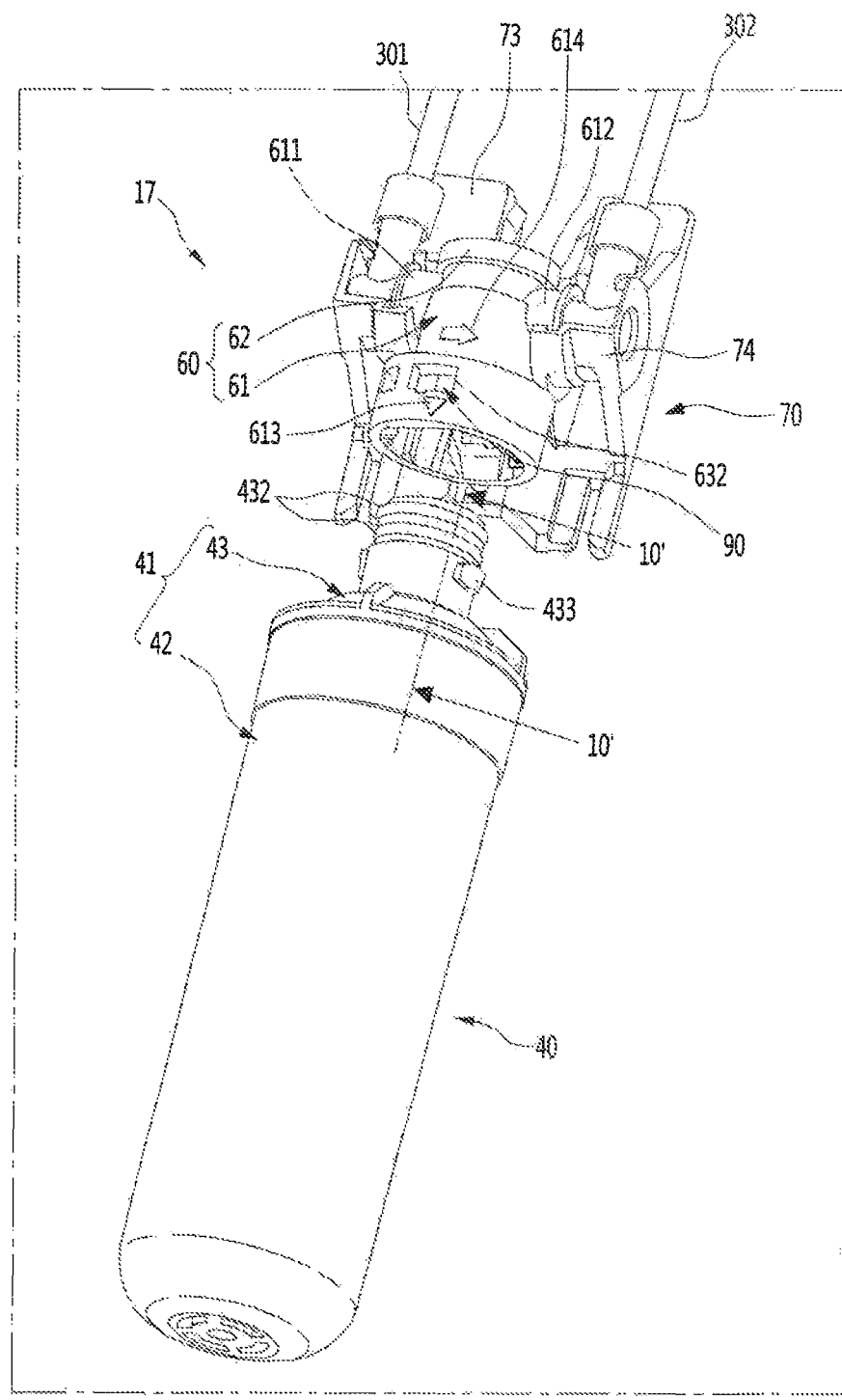
FIG. 6 is an exploded perspective view illustrating a state where a filter and a head of the water purifying apparatus are separated according to an embodiment of the invention.

FIG. 5 is a perspective view illustrating a structure of a water purifying apparatus according to another embodiment of the invention. FIG. 6 is an exploded perspective view illustrating a state where a filter and a head of the water purifying apparatus are separated.

With reference to FIGS. 5 and 6, a water purifying apparatus 17 may include a filter 40 and a head 60. The water purifying apparatus 17 may further include a mounting member 70 on which the head 60 is mounted.

The filter 40 may have a cylindrical shape (not limited thereto). The outer shape of the filter 40 may be formed by the housing 41. The housing 41 may include a housing body 42 to accommodate a filtering member (44 in FIG. 7) in an inside portion thereof, and a housing cap 43 which may be coupled to an upper end of the housing body 42 to form an upper portion of the housing 41.

The housing body 42 may have a cylindrical shape (not limited thereto) to define a first accommodating space for accommodating the filtering member 44. The housing body 42 may have an upper opening portion.

The housing cap 43 may be coupled to the upper opening portion of the housing body 42. The housing cap 43 may define a second accommodating space for accommodating a portion of the filtering member 44. As such, a portion of the housing cap 42 may have a cylindrical shape. The housing cap 43 includes an upper opening portion. A portion of the shaft 90 is capable of being inserted through the upper opening portion of the housing cap 43 (discussed in more detail below).

The housing cap 43 may be inserted into an opened lower surface of the head 60. A pair of O-rings 432 may be provided at an upper end of the housing cap 43. The O-rings 432 may be hermetically sealed with the inner surface of the head 60 to prevent leakage.

A coupling projection 433 may be provided on an outer circumferential surface of the upper portion of the housing cap 43. The coupling projection 433 is capable of being moved along a coupling groove 631 which is formed on an inner surface of the head 60 when the upper portion of the filter 40 is inserted into the inside of the head 60.

The coupling projection 433 and the coupling groove 631 may be formed in a direction intersecting a direction into which the filter 40 is inserted. Accordingly, the filter 40 is rotated in a state of being inserted into the inside of the head 60 and may have a structure in which the coupling projection 433 and the coupling groove 631 are coupled to each other by rotation of the filter 40. In a state where the filter 40 and the head 60 are fully coupled to each other, the supplying water is capable of flowing into the inside portion of the filter 40 by the filter 40 and the flow path of the head 60 being connected to each other in the inside portion thereof.

The mounting member 70 may include a base 73 which is mounted to one side wall surface of the refrigerator 1 or the case 171, and rotating support portions 74 which project from both sides of the base 73 and rotatably support both sides of the head 60.

End portions of the water inlet pipe 301 and the water outlet pipe 302 may be disposed on the rotating support portion 74. The water inlet pipe 301 and the water outlet pipe 302 may be connected to a water inlet portion 611 and a water outlet portion 612 of the head 60 at the rotating support portion 74.

The head 60 may be rotatably mounted on the mounting member 70 by the rotating support portion 74. Therefore, a space for attachment and detachment of the filter 40 can be formed by operating rotation or tilting of the head 60 at the time of attachment and detachment of the filter 40. Thus, the manual operation for the attachment and detachment of the filter 40 can be more easily performed.

The head 60 may be formed in a cylindrical shape (not limited thereto) having an opened lower surface. The head 60 may include a head body 61 to which the filter 40 is inserted and fixed, and a shaft 90 which is accommodated in the inside of the head body 61. The head 60 may further include a head cap 62 to shield an opened upper surface of the head body 61.

An insertion indicating portion 613 for indicating an insertion position of the coupling projection 433 may be formed on the outer surface of the head body 61. The insertion indicating portion 613 may be formed by printing, molding or machining. The user can recognize the position of the coupling groove 631 by viewing the insertion indicating portion 613, and may more easily perform alignment between the coupling projection 433 and the coupling groove 631.

A rotation indicating portion 614 for indicating the rotational direction of the filter 40 may be formed on the outer surface of the head body 61. The rotation indicating portion 614 may be formed by printing, molding or machining. The engagement projection 433 may be moved along and coupled to the inside of the coupling groove 631 by the user operating rotation of the filter 40 in a correct direction by the rotation indicating portion 614.

An opening portion 632 for checking the engaging restraint state of the coupling projection 433 may be further formed on the outer surface of the head body 61. The opening portion 632 may be formed at a position which corresponds to the position of the coupling groove 631 or may include at least a portion of the coupling groove 631.

Figure 7:
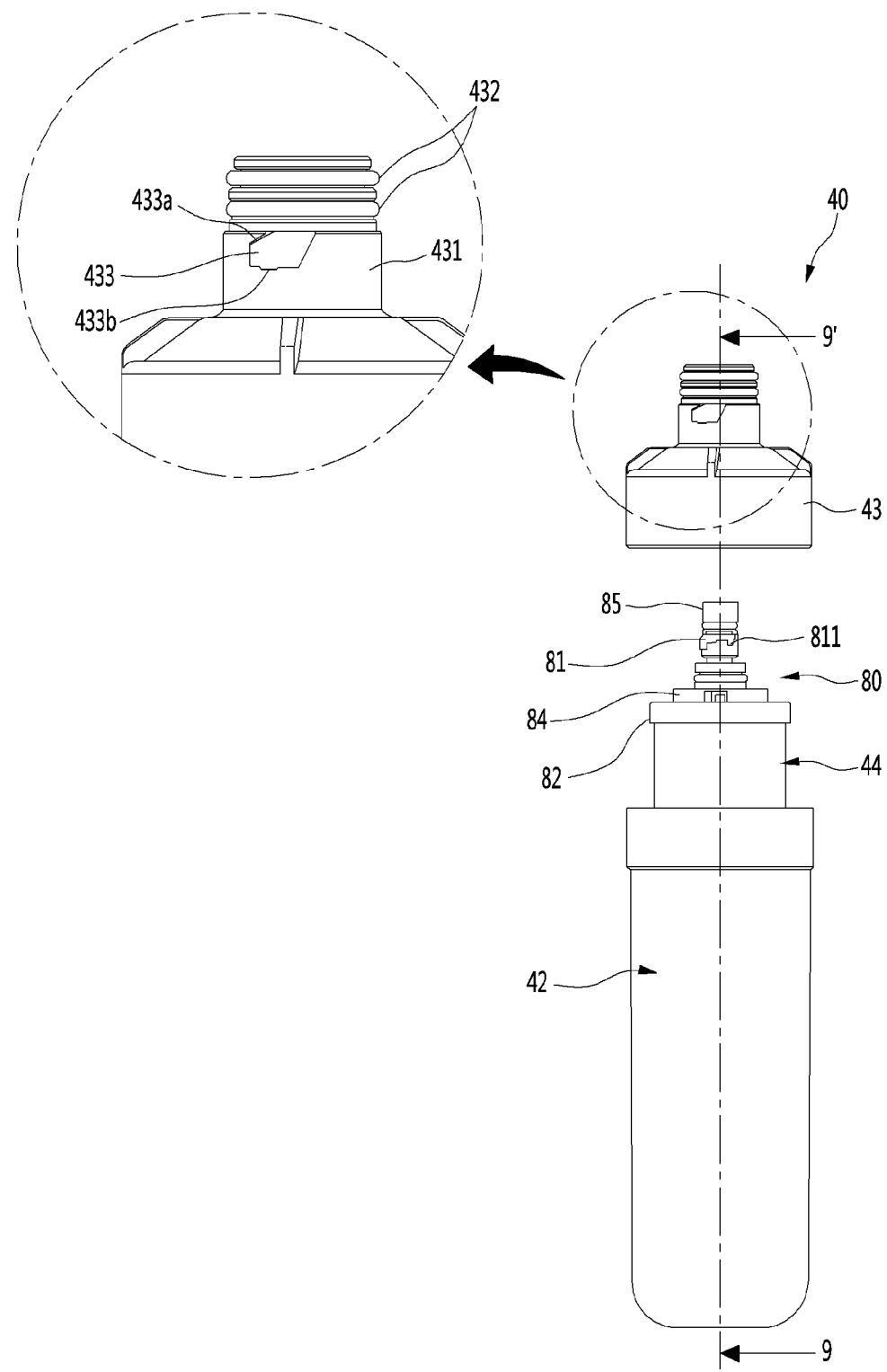
FIG. 7 is an exploded view illustrating the structure of the filter according to an embodiment of the invention.
Figure 8:
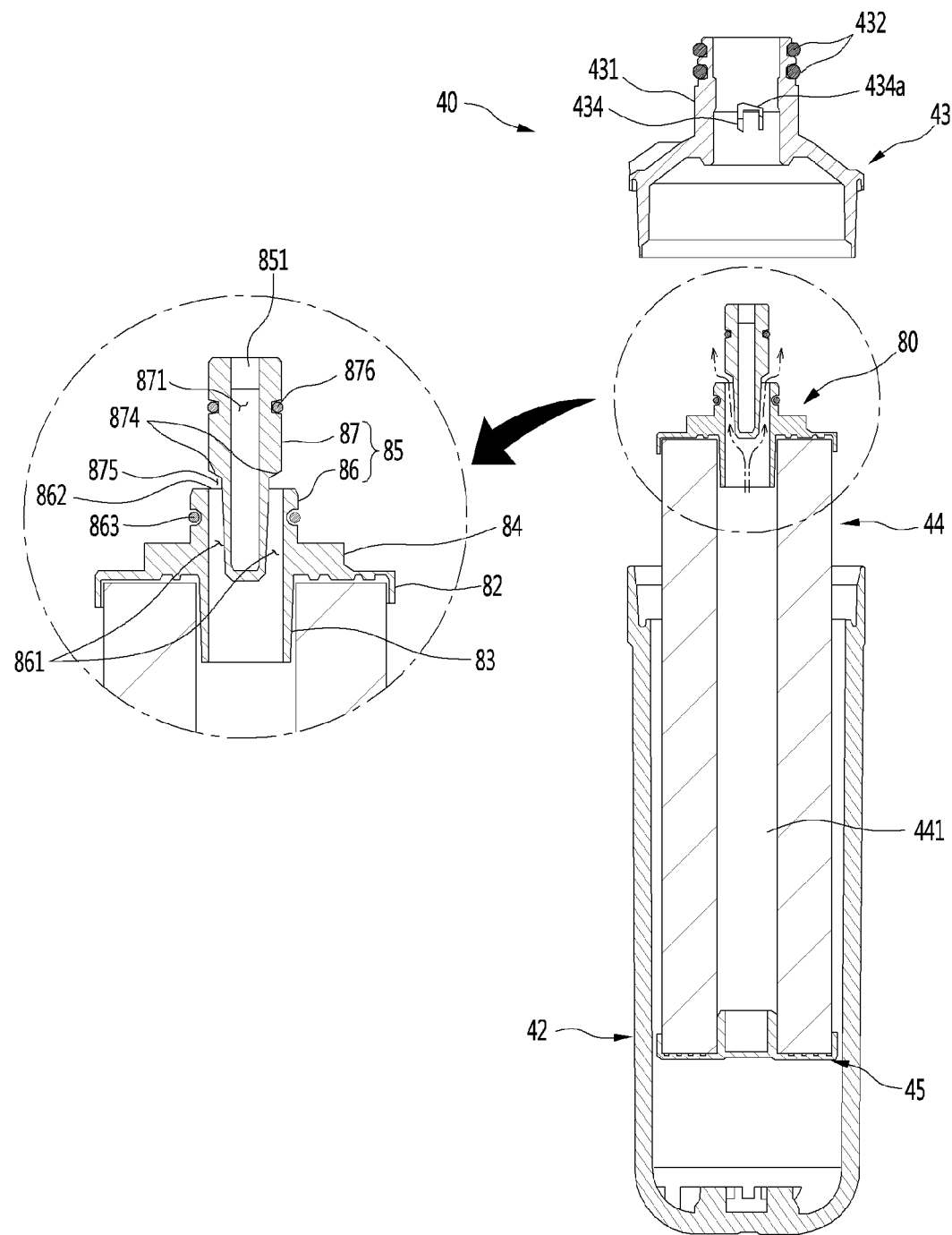
FIG. 8 is a longitudinal sectional view of FIG. 7.
Figure 9:
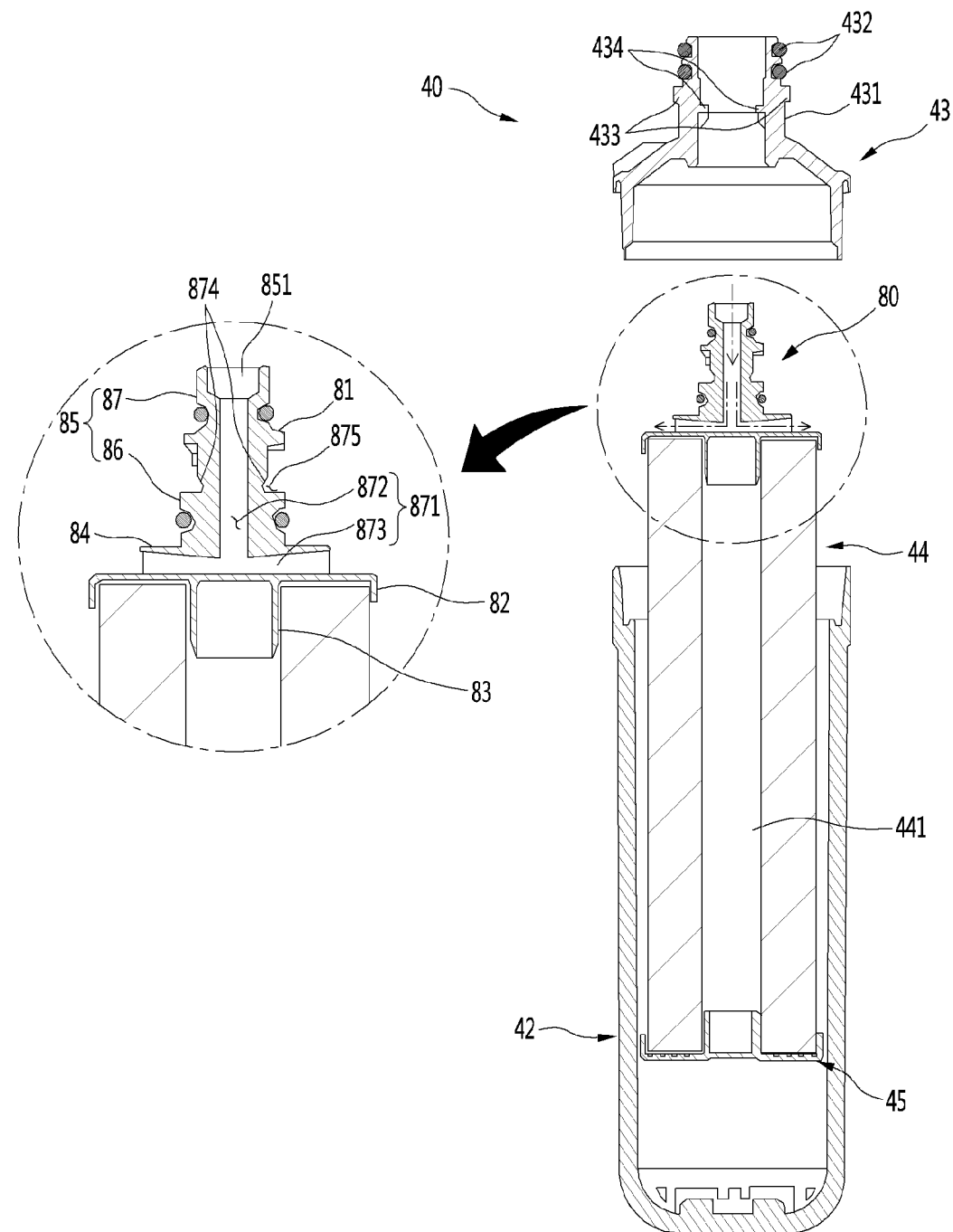
FIG. 9 is a sectional view taken along line 9-9' of FIG. 7.
Figure 10:
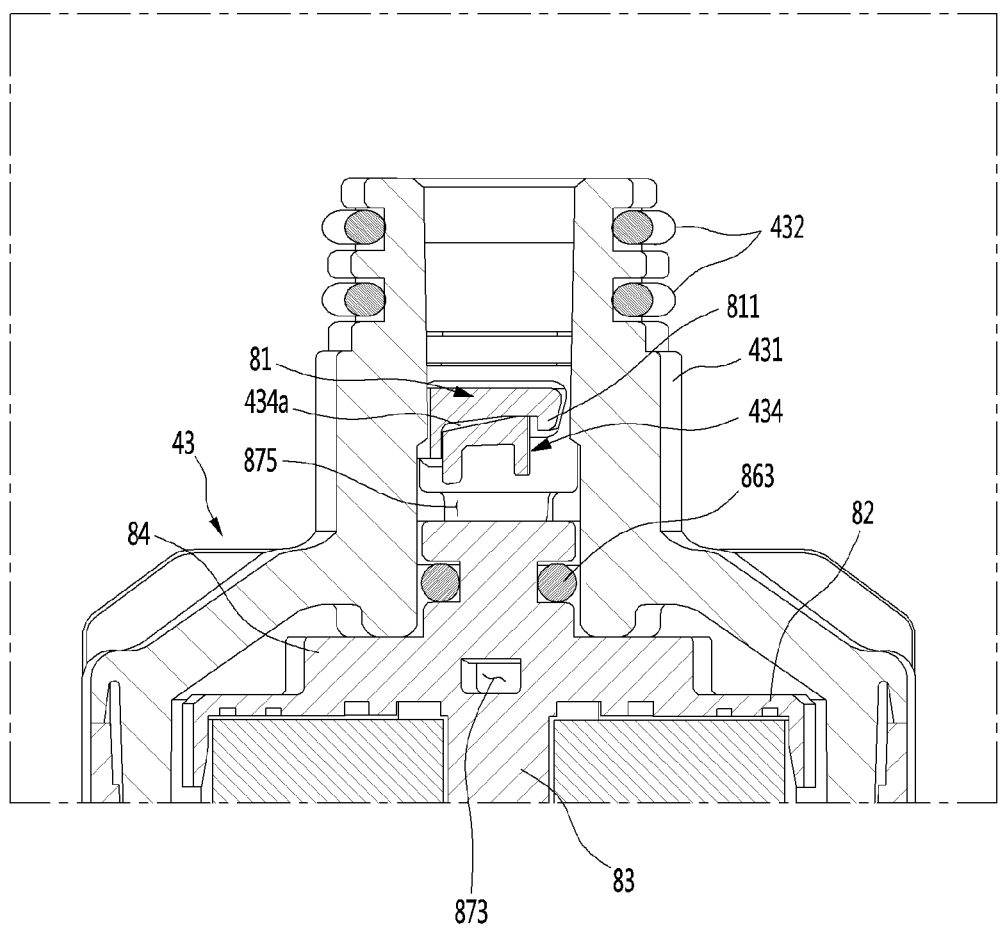
FIG. 10 is a sectional view taken along line 10-10' of FIG. 6.

FIG. 7 is an exploded view illustrating the structure of the filter according to an embodiment of the invention. FIG. 8 is a longitudinal sectional view of FIG. 7. FIG. 9 is a cross-sectional view taken along line 9-9' of FIG. 7. FIG. 10 is a cross-sectional view taken along line 10-10' of FIG. 6.

With reference to FIGS. 7-10, the filter 40 may include a filter housing 41 which forms an outer shape of the filter 40, a filtering member 44 provided in the filter housing 41, and an upper supporter 80 for supporting the filtering member 44.

The filter 40 may further include a lower supporter 45 for supporting the filtering member 44 in the filter housing 41.

The filter housing 41 may be formed in a cylindrical shape (not limited thereto), and may be formed by the housing body 42 and the housing cap 43 being coupled together. A filter inserting portion 431 may be formed on the upper end of the housing cap 43. A plurality of O-rings 432 may be vertically arranged in the filter inserting portion 431.

The coupling projection 433 may be formed on a lower side of the plurality of O-rings 432 on the outside of the filter inserting portion 431. A pair of coupling projections 433 may be formed at positions which are opposite to each other, and may be formed to have a size that is capable of being inserted into the coupling groove 631.

The coupling projection 433 may include a projection guide portion 433a. The projection guide portion 433a may be formed to have a slope or a predetermined curvature on the upper surface of the coupling projection 433. The coupling projection 433 is configured to be in contact with a groove guide portion (633 in FIG. 15) for guiding the coupling projection 433 to the entrance of the coupling groove 631 so as to guide rotation of the coupling projection 433 in one direction.

A restraining projection 433b which projects to a lower side may be formed on one side of the lower surface of the coupling projection 433. The restraining projection 433b may be engaged with the inside of the coupling groove 631 to be restrained. Accordingly, the filter 40 is capable of being fixed to the inside of the head 60 in a state where the coupling projection 433 is fully inserted into the inside of the coupling groove 631.

On the other hand, the inside portion of the filter inserting portion 431 may be formed having a hollow shape. A housing fastening portion 434 for being coupled with the upper supporter 80 may protrude from the inner side of the filter inserting portion 431. In other words, the upper supporter 80 is capable of being accommodated in the second accommodating space in which the housing cap 43 is defined. The upper supporter 80 may be coupled to the upper portion of the filtering member 44 and the inner surface of the housing cap 43, respectively.

The upper surface 434a of the housing fastening portion 434 may be an inclined surface. For example, a pair of housing fastening portions 434 may be formed at positions facing each other, and may be formed so that inclined directions thereof are opposed to each other.

A supporter fastening portion 81 may be formed on the upper supporter 80 which corresponds to the housing coupling portion 434. For example, the supporter fastening portion 81 may be formed on the second extending portion 87. A hook portion 811 may be formed at one end of the supporter fastening portion 81.

In a case where the upper end of the upper supporter 80 may be rotated in one direction in a state of being inserted into the filter inserting portion 431, the hook portion 811 of the supporter fastening portion 81 moves along the inclined surface of the upper surface of the housing fastening portion 434 to be restrained. In a state where the upper supporter 80 is fully rotated, the hook portion 811 of the supporter fastening portion 81 engages with the end portion of the housing fastening portion 434 and thus the upper supporter 80 is capable of being coupled to the housing cap 43.

The supporter fastening portion 81 and the housing fastening portion 434 may have various structures which are mutually combined with each other and the filter housing 41 and the upper supporter 80 in the inside portion of the filter housing 41 may be integrated with each other by the supporter fastening portion 81 and the housing fastening portion 434 being coupled to each other. Therefore, when the filter 40 is rotated while the filter 40 is being mounted, the upper supporter 80 may also rotate with the filter 40.

On the other hand, the filtering member 44 may be accommodated inside the filter housing 41. The filtering member 44 may be a standard carbon filter or a membrane filter. However, it is understood that various types of filters may be used depending on the required purifying performance.

The filtering member 44 may be formed in a cylindrical shape (not limited thereto) having a hollow 441 formed at the center thereof in the vertical direction. The upper supporter 80 and the lower supporter 45 may be coupled to the upper end and the lower end of the filtering member 44 so that the filtering member 44 is capable of being fixedly mounted on the inside of the filter housing 41.

An outer diameter of the filtering member 44 may be smaller than the inner diameter of the filter housing 41 and a space for flowing water between the filter housing 41 and the outer surface of the filtering member 44 may be formed.

The upper supporter 80 may be disposed at the upper end of the filtering member 44 and extend in the upper direction to form a passage connecting the inlet portion of the filter inserting portion 431 and the hollow 441 to each other. Accordingly, water supplied from the head 60 is capable of flowing into the filtering member 44 through the filter inserting portion 431 and water purified in the filtering member 44 flows out to the head 60.

The upper supporter 80 may include a supporter accommodating portion 82 for accommodating the upper end of the filtering member 44.

The upper supporter 80 may further include a supporter inserting portion 83 which extends from a central portion of the supporter accommodating portion 82 in the lower direction and is inserted into the hallow 441 of the filtering member 44.

The upper supporter 80 may further include a supporter stepped portion 84 which projects from the upper surface of the supporter inserting portion 83 in the upper direction.

The upper supporter 80 may further include a supporter extending portion 85 extending from the center of the upper surface of the supporter stepped portion 84 toward the inside of the filter inserting portion 431.

Figure 11:
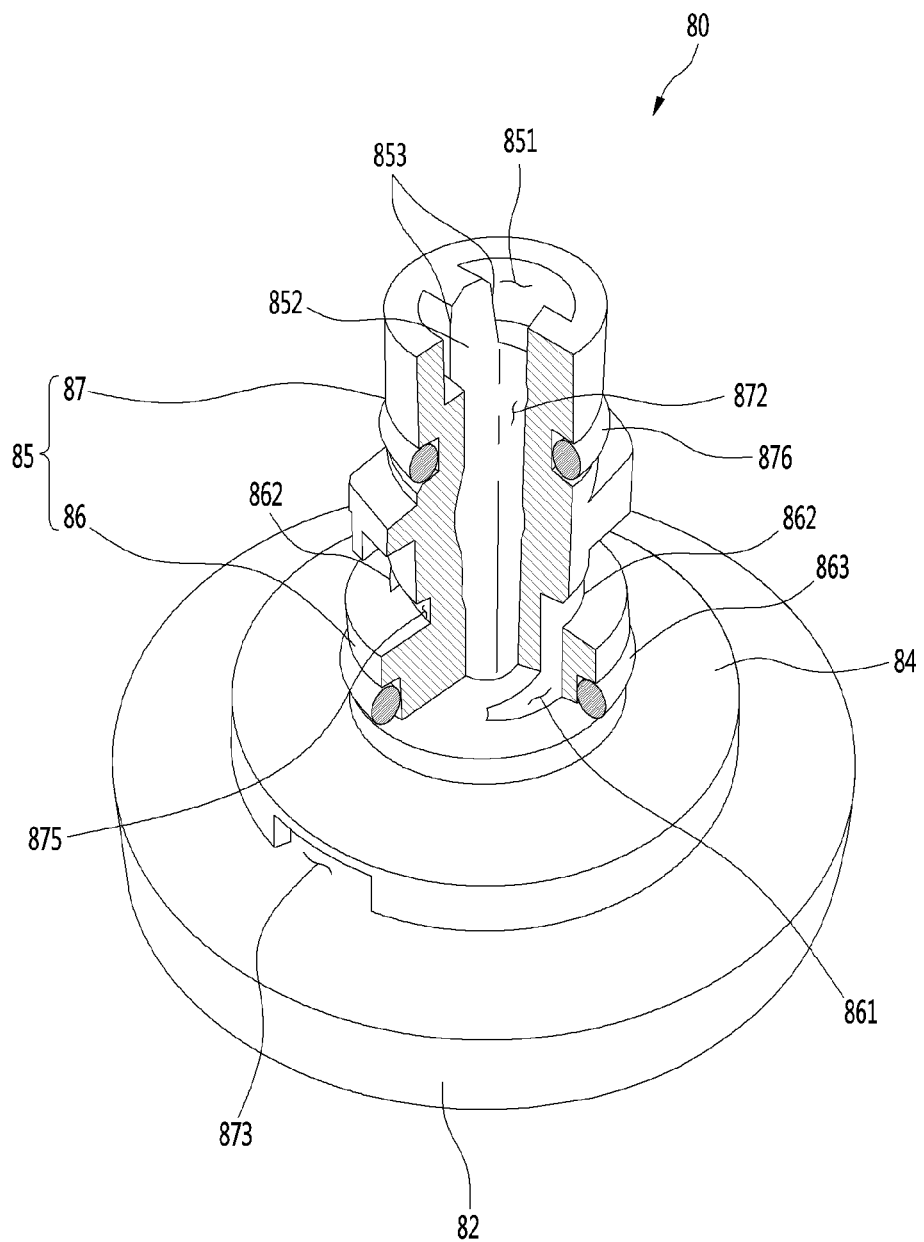
FIG. 11 is a partially cutaway perspective view illustrating an upper supporter of the filter according to an embodiment of the invention.

FIG. 11 is a partially cutaway perspective view illustrating an upper supporter of the filter according to an embodiment of the invention.

The upper supporter 80 will be described in more detail with reference to FIGS. 8-11.

When the upper supporter 80 and the filtering member 44 are coupled together, the supporter accommodating portion 82 may surround the upper surface and a circumference of the filtering member 44. The supporter inserting portion 83 may be inserted into the hollow 441 such that it is in contact with an inner surface of the filtering member 44 so that the upper supporter 80 is capable of being fixedly mounted on the upper surface of the filtering member 44.

The inside portion of the supporter inserting portion 83 may be hollow such that it is capable of communicating with a filter outlet flow path 861 formed on the supporter extending portion 85. Accordingly, the purified water flowing into the hollow 441 of the filtering member 44 may pass through the supporter inserting portion 83, the filter outlet flow path 861 and a filter outlet port 862 of the end portion of the filter outlet flow path 861 in this order and be discharged through the opening of the filter inserting portion 431.

The supporter stepped portion 84 may protrude from the upper surface of the supporter accommodating portion 82. The supporter stepped portion 84 may have a smaller diameter than the supporter accommodating portion 82. The circumference of the supporter stepped portion 84 and the supporter accommodating portion 84 may be spaced apart from the inner surface of the housing cap 43 when the housing cap 43 and the upper supporter 80 are coupled together.

The supporter extending portion 85 may extend from the center of the supporter step portion 84 in the upper direction. The supporter extending portion 85 may be located in the filter inserting portion 431 when the housing cap 43 and the upper supporter 80 are coupled together. A filter inlet flow path 871 and a filter outlet flow path 861 may be formed in the inside of the supporter extending portion 85. Therefore, water supplied into the inside portion of the filter 40 and discharged from the purified water from the filter 40 is capable of being performed through the supporter extending portion 85.

For example, a first filter inlet flow path 872 extending in a lower direction may be formed on the opened upper surface of the supporter extending portion 85. The supporter stepped portion 84 may include a second filter inlet flow path 873 passing across the supporter stepped portion 84.

The second filter inlet flow path 873 may have an opening formed in a circumferential surface of the supporter stepped portion 84 and extending toward the center of the supporter stepped portion 84. The first filter inlet flow path 872 and the second filter inlet flow path 873 may be connected to each other at a lower end of the supporter extending portion 85, that is, at the inside of the supporter stepped portion 84.

Accordingly, the water which flows through the filter inserting portion 431 flows through the first filter inlet flow path 872 of the supporter extending portion 85 and then flows along the second filter inlet flow path 873 which is branched into both sides at the lower end of the first filter inlet flow path 872 to the outside and is thus capable of being discharged through an opening of the circumference of the supporter stepped portion 84.

The water which is discharged through the filter inlet flow path 871 flows along the space between the filter housing 41 and the filtering member 44. The water which flows into the outside of the filtering member 44 may be purified in the process of coming in the hollow 441 through the filtering member 44.

On the other hand, the supporter extending portion 85 may include a first extending portion 86 which extends from the upper surface of the supporter stepped portion 84 and a second extending portion 87 which extends from the first extending portion 86 in the upper direction. The first extending portion 86 may have an outer diameter which is larger than the outer diameter of the second extending portion 87 and the filter outlet port 862 may be formed on the upper side portion of the first extending portion 86.

A guide surface 874 which is recessed in the inside direction may be formed on the outer surface of the second extending portion 87 of the upper side of the filter outlet port 862. The guide surface 874 may be inclined and spaced apart from the filter outlet port 862 in the upper direction. Therefore, when the purified water which is discharged to the filter outlet port 862 flows in the upper direction, the water is guided to the outside of the second extending portion 87 by the guide surface 874 so that the water can flow more effectively.

A portion of the second extending portion 87 may extend toward the inside of the first extending portion 86 at the lower end of the guide surface 874. At this time, the filter outlet flow path 861 may be defined in a space between an inner surface of the first extending portion 86 and an outer surface of the second extending portion 87. The first filter inlet flow path 872 may extend from the opened upper surface of the second extending portion 87 to the lower end thereof.

On the other hand, the outer diameter of the first extending portion 86 is formed to be somewhat smaller than the inner diameter of the filter inserting portion 431 and the purified water which is discharged through the filter outlet port 862 is capable of being discharged through a space between the first extending portion 56 and the filter inserting portion 431.

An outlet port groove 875 may be formed in the lower end of the guide surface 874 of the upper side of the filter outlet port 862. The outlet port groove 875 may be formed to be recessed along the circumference of the second extending portion 87. Accordingly, the water which is discharged from the filter outlet ports 862 is capable of flowing along the outlet port groove 875 and being discharged along the water outlet guide portion 965b formed on the outer surface of the shaft 90.

The outer diameter of the second extending portion 87 may correspond to the inner diameter of the shaft 90 which is located in the inside of the filter inserting portion 431. Therefore, in a case where the second extending portion 87 and the shaft 90 are communicably coupled together, water supplied through the inside of the shaft 90 is capable of flowing inside of the second extending portion 87.

A first extending portion O-ring 863 may be provided on the outside of the first extended portion 86 and a second extending portion O-ring 876 may be provided on the outside of the second extending portion 87. The first extending portion O-ring 863 is provided to create a hermetic seal between the inside of the filter inserting portion 431 and the first extending portion 86. The second extending portion O-ring 876 may be in close proximity with the inner surface of the shaft 90 to provide a hermetic seal between the second extending portion 87 and the shaft 90.

Therefore, the purifying water which flows into the inside of the supporter extending portion 85 and the purified water which is discharged to the outside of the supporter extending portion 85 may flow through independent flow paths respectively without leakage or mixing with each other (or substantially reduced leakage/mixing).

On the other hand, a first connecting portion 851 may be formed on the upper end of the supporter extending portion 85. The first connecting portion 851 may be recessed toward the inside from the upper end of the supporter extending portion 85 and may be symmetrical to both the left side and the right side thereof. The first connecting portion 851 may have a shape corresponding to that of the second connecting portion 972 of the shaft 90 (to be described below) so as to be engaged with each other when the second connecting portion 972 is inserted into the first connecting portion 851. The shaft 90 and the filter 40 may be rotated together in a state where the first connecting portion 851 and the second connecting portions 972 are coupled together.

The first connecting portion 851 may be symmetrical with respect to a projecting portion 852 projecting from a position which is opposite to the inner surface of the supporter extending portion 85 while being recessed at a predetermined depth. A first inclined surface 853 may be formed on both side ends of the first connecting portion 851, that is, on both side surfaces of the projecting portion 852. The first inclined surface 853 may be shaped such that the width of the first connecting portion 851 gradually increases and the width of the projecting portion 852 gradually decreases from the lower side to the upper side of the first inclined surface. In other words, the first connecting portion 851 may be formed so that the width thereof is gradually narrowed toward the depth direction to be recessed.

The first inclined surface 853 may be inclined in a direction crossing a lengthwise vertical direction of the first inclined surface 853, that is, in a direction of rotation of the filter 40. Accordingly, the projecting portion 852 may be formed so that the width thereof is gradually widen from the inner surface of the supporter extending portion 85 toward the center of the inner diameter of the supporter extending portion 85.

With such configuration, the first connecting portion 851 and the second connecting portion 972 can be more easily assembled. In addition, in a case where the torsion moment is applied when the first connecting portion 851 and the second connecting portion 972 are in contact with each other, the first connecting portion 851 and the second connecting portion 972 are slid so that the filter 40 can be more easily separated from the shaft 90.

Figure 12:
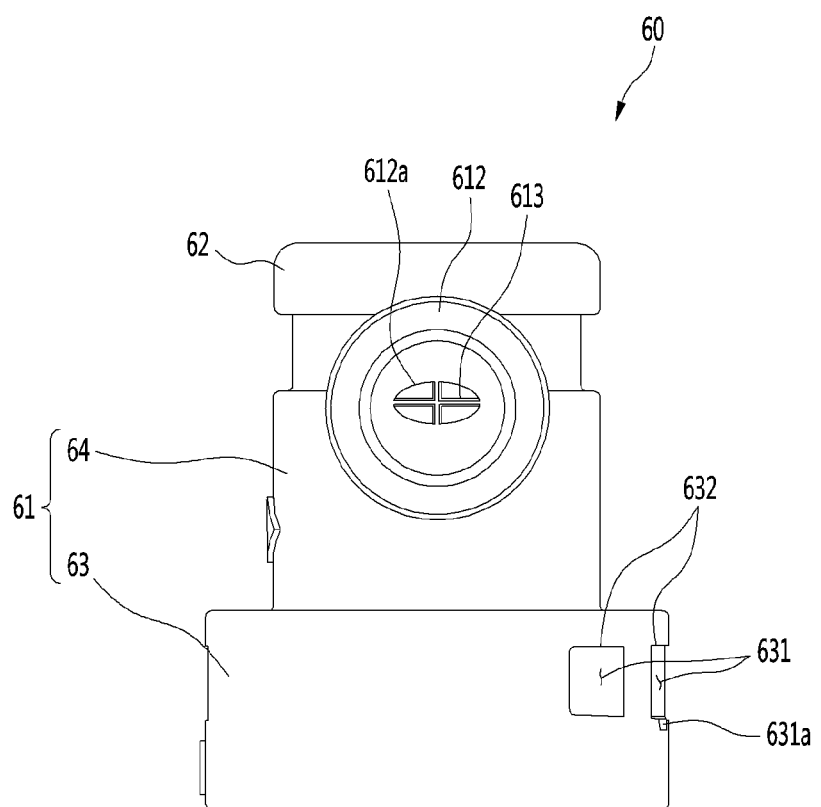
FIG. 12 is a side view illustrating the head according to an embodiment of the invention.
Figure 13:
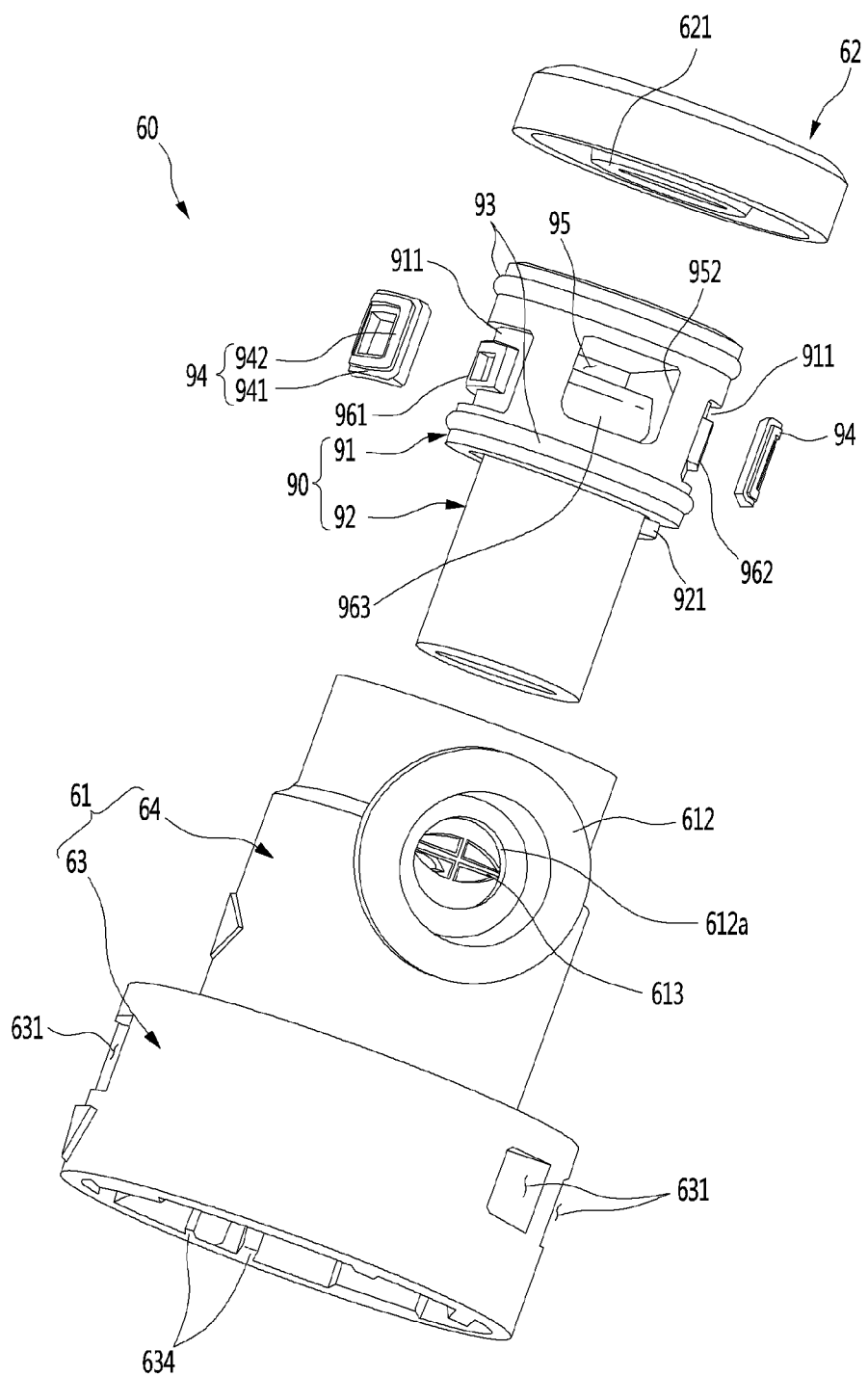
FIG. 13 is an exploded perspective view illustrating a coupling structure of the head viewed from a side according to an embodiment of the invention.

FIG. 12 is a side view illustrating the head according to an embodiment of the invention. FIG. 13 is an exploded perspective view illustrating a coupling structure of the head viewed from a side, and FIG. 14 is an exploded perspective view illustrating the coupling structure of the head viewed from the other side.

Figure 14:
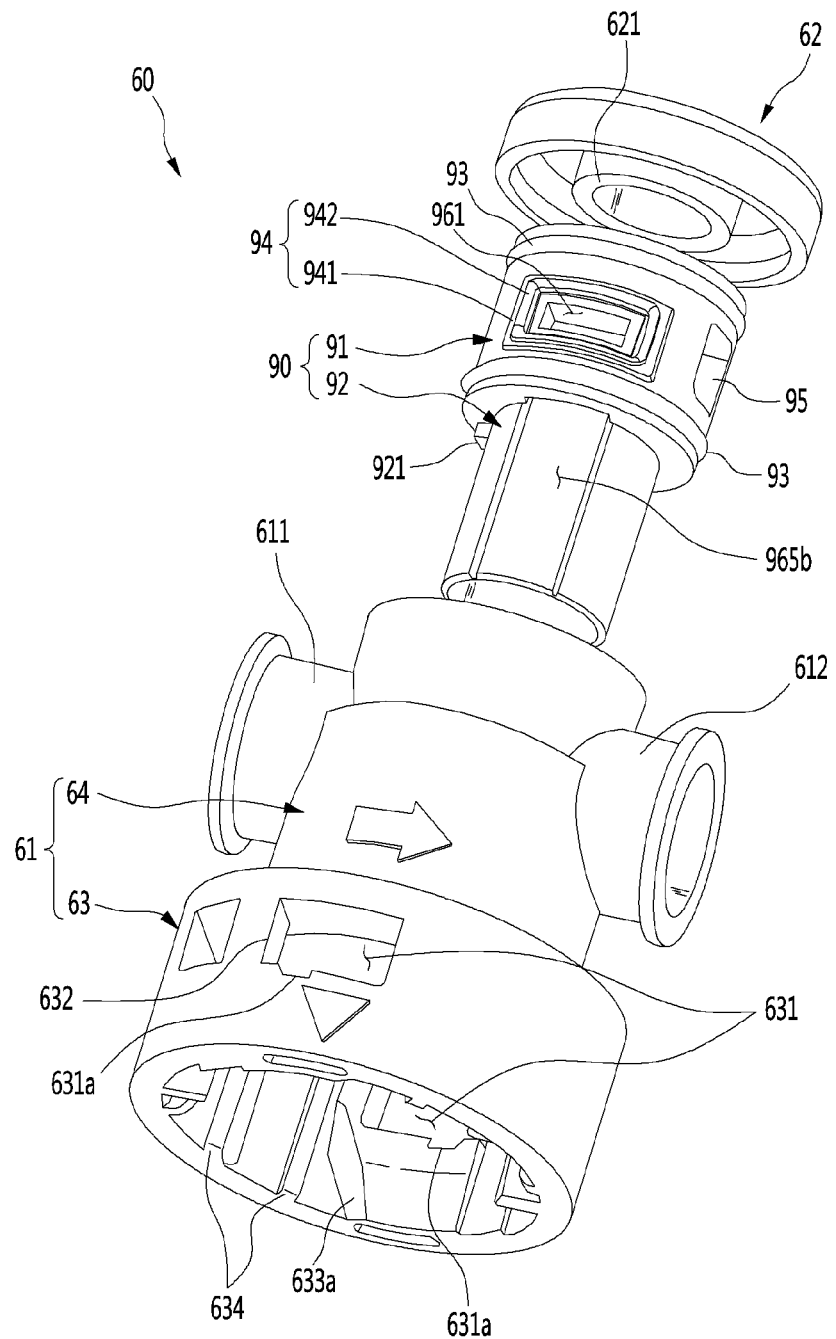
FIG. 14 is an exploded perspective view illustrating the coupling structure of the head viewed from the other side according to an embodiment of the invention.

With reference to FIGS. 12-14, the shaft 90 may be inserted through the opened upper surface of the head body 61, and the head cap 62 may shield or cover the opened upper surface of the head body 61.

The head body 61 may include a lower body 63 and an upper body 64.

The lower body 63 is a portion into which the filter inserting portion 431 may be inserted and to which the filter inserting portion 43 may be coupled. The lower surface of the lower body 63 may be opened so that the filter 40 can be accommodated. The coupling groove 631 for inserting the coupling projection 433 may be formed on the lower body 63.

An opening portion 632 for forming the coupling groove 631 may be formed on the lower body 63 and the insertion state of the coupling projection 433 may be confirmed through the opening portion 632. A plurality of supporting ribs 634 for supporting the outer side of the filter inserting portion 431 may be formed on the circumference of the inner surface of the lower body 63 to prevent the filter 40 from sagging in a state where the filter inserting portion 431 is inserted into the lower body 63.

The upper body 64 may be formed at an upper end of the lower body 63 and may have a smaller diameter than the diameter of the lower body 63. The shaft 90 may be mounted on the inside of the upper body 64 and the shaft 90 is inserted through the opened upper surface of the upper body 64 and thus may be mounted on the inside of the upper body 64.

The upper end of the filter inserting portion 431, the upper end of the supporter extending portion 85, and the lower end of the shaft 90 may be disposed on the inside of the upper body 64. A flow path through which purified water through the filter 40 is capable of flowing may be formed by coupling portions.

A water inlet portion 611 and a water outlet portion 612 may be formed to project to the outside in the upper body 64. The water inlet portion 611 and the water outlet portion 612 may communicate with a water inlet pipe 301 and a water outlet pipe 302, respectively. At this time, the water inlet portion 611 and the water outlet portion 612 can selectively communicate with the flow path formed in the shaft 90. The water inlet portion 611 and the water outlet portion 612 may be disposed in a straight line so as to face each other in the head.

The head cap 62 may shield the upper surface of the upper body 64. More particularly, the head cap 62 may press against the upper surface of the shaft 90 so that the shaft 90 can maintain a state of being fixedly mounted on the inside of the upper body 64. To this end, a cap support portion 621 extending to the upper surface of the shaft 90 may be formed on a lower surface of the head cap 62.

The shaft 90 is capable of selectively switching the flow path of water flowing in the inside of the head 60. The shaft 90 may be rotatably seated on the upper body 64. A filtering flow path 96 and a bypass flow path 95 may be formed in the shaft 90. The flow paths may be selectively connected to the water inlet portion 611 and the water outlet portion 612 by the rotation of the shaft 90.

The shaft 90 may include an upper part 91 and a lower part 92. The upper part 91 may have a larger diameter than the diameter of the lower part 92, and may have an outer diameter corresponding to the inner diameter of the upper body 64.

A shaft O-ring 93 may be provided at the upper end and the lower end of the upper part 91, respectively. The shaft O-ring 93 may provide a hermetic seal between the shaft 90 and the inner surface of the upper body 64 so as to prevent leakage of water flowing through the head 60.

A shaft inlet port 961 and a shaft outlet port 962 may be formed on the circumference of the upper part 91 between the plurality of shaft O-rings 93, respectively. More particularly, the shaft inlet port 961 and the shaft outlet port 962 may be formed at positions facing each other and at positions corresponding to the water inlet portion 611 and the water outlet portion 612. Therefore, water which passes through the water inlet portion 611 can flow in the shaft inlet port 961, and water which passes through the shaft outlet port 962 can be discharged through the water outlet portion 612.

On the other hand, the shaft inlet port 961 and the shaft outlet port 962 may have a rectangular shape; however it is not limited to this. A sealing member mounting portion 911 on which a sealing member 94 is mounted may be formed on the circumference of the shaft inlet port 961 and the shaft outlet port 962. The sealing member mounting portion 911 and the sealing member 94 may have a rectangular shape corresponding to the shaft inlet port 961 and the shaft outlet port 962.

At this time, the sealing member 94 may include a pressing portion 941 which is pressed into and mounted on the inside of the sealing member mounting portion 911, and a sealing portion 942 which projects along the circumference of the pressing portion 941. The sealing portion 942 may be in contact with the inner surface of the upper body 64 when the shaft 90 is mounted. Accordingly, when the shaft inlet port 961 and the shaft outlet port 962 are connected to the water inlet portion 611 and the water outlet portion 612 by the rotation of the shaft 90, leakage of water between the shaft 90 and the head 60 is prevented or substantially reduced. The shape of the sealing member 94 may be formed to be lengthened in a direction in which the shaft 90 is rotated so that the removal of the sealing member 94 from the shaft 90 or interference of the sealing member 94 with the shaft 90 is minimized during the rotation of the shaft 90.

A sealing rib 613 may be formed in a water inlet port 611a and a water outlet port 612a which are formed in the water inlet portion 611 and the water outlet portion 612, respectively. The sealing ribs 613 prevent the sealing member 94 from being separated or damaged and may be formed to cross the water inlet port 611a and the water outlet port 612a of the inner surface of the upper body 64. The sealing ribs 613 may extend laterally and a plurality of sealing ribs 613 may be disposed in a direction intersecting each other.

Therefore, the sealing member 94 which is passed by the water inlet port 611a and the water outlet port 612a, which are formed in the water inlet portion 611 and the water outlet portion 612 respectively, is hooked into the water inlet port 611a and the water outlet port 612a in a process of the rotation of the shaft 90. Thus, the sealing member 94 is capable of being prevented from being separated from the sealing member mounting portion 911. In other words, since a state where the sealing ribs 613 press against the outer surface of the sealing member 94 in the process of the rotation of the shaft 90, the sealing member 94 is capable of being prevented from being separated from the sealing member mounting portion 911.

A bypass inlet port 951 and a bypass outlet port 952 may be formed between the shaft inlet port 961 and the shaft outlet port 962 of the outer surface of the upper part 91, respectively. The bypass inlet port 951 and the bypass outlet port 952 may also be disposed at positions facing each other. Accordingly, in a case where the bypass inlet port 951 and the bypass outlet port 952 are aligned with the water inlet portion 611 and the water outlet portion 612 by the rotation of the shaft 90, the water supplied to the water inlet portion 611 is capable of being discharged directly to the water outlet portion 612 through the bypass flow path 95.

The bypass inlet port 951 and the bypass outlet port 952 may be formed at positions which are the same height as the shaft inlet port 961 and the shaft outlet port 962, respectively, and which are rotated by 90 degrees to each other. Therefore, to connect the filtering flow path 96 or the bypass flow path 95 to the water inlet portion 611 and the water outlet portion 612, the shaft 90 should be rotated by 90 degrees.

A portion which forms the upper end of the filtering flow path 96 is capable of projecting from the bypass flow path 95 in the inside of the upper part 91. Accordingly, it is possible to realize the filtration flow path 96 and the bypass flow path 95 at the same time in a state where the height of the shaft 90 is minimized. Through this, the head 60 and the water purifying apparatus 17 can have a more compact configuration.

A rotating projection 921 may be provided on the lower surface of the upper part 91. A pair of rotating projections may be formed and one rotating projection may be formed at a position corresponding to the shaft inlet port 961 and the shaft outlet port 962, respectively. In other words, the pair of rotating projections 921 may be formed at positions which are rotated by 90 degrees with respect to each other.

On the other hand, the lower part 92 may extend from the center of the upper part 91 in the lower direction. The lower part 92 may be smaller than the inner diameter of the seating portion 65 and extend through the seating portion 65 in the lower direction. The lower part 92 may extend to a length such that the shaft 90 and the upper supporter 80 can be engaged with each other when the filter 40 is coupled to the head 60.

A water outlet guide portion 965b may be formed on one side surface of the lower part 92. The water outlet guide portion 965b may extend vertically from the lower side of the shaft outlet port 962. For example, the water outlet guide portion 965b may be formed by cutting a portion of the outer surface of the lower part 92 having a cylindrical shape into a planar shape.

Therefore, in a state where the shaft 90 is mounted on the head 60, the water outlet guide portion 965b of the shaft 90 may be spaced apart from the inner surface of the head 60 and thus the shaft water outflow path 965 which is a flow path of water is formed. Since the lower end of the water outlet guide portion 965b is located on the upper side of the filter outlet port 862, the water discharged from the filter outlet port 862 is moved along the water outlet guide portion 965b in the upper direction, and then passes by the shaft outlet port 962 and the water outlet portion 612 in this order and flows to the water outlet pipe 302.

Figure 15:
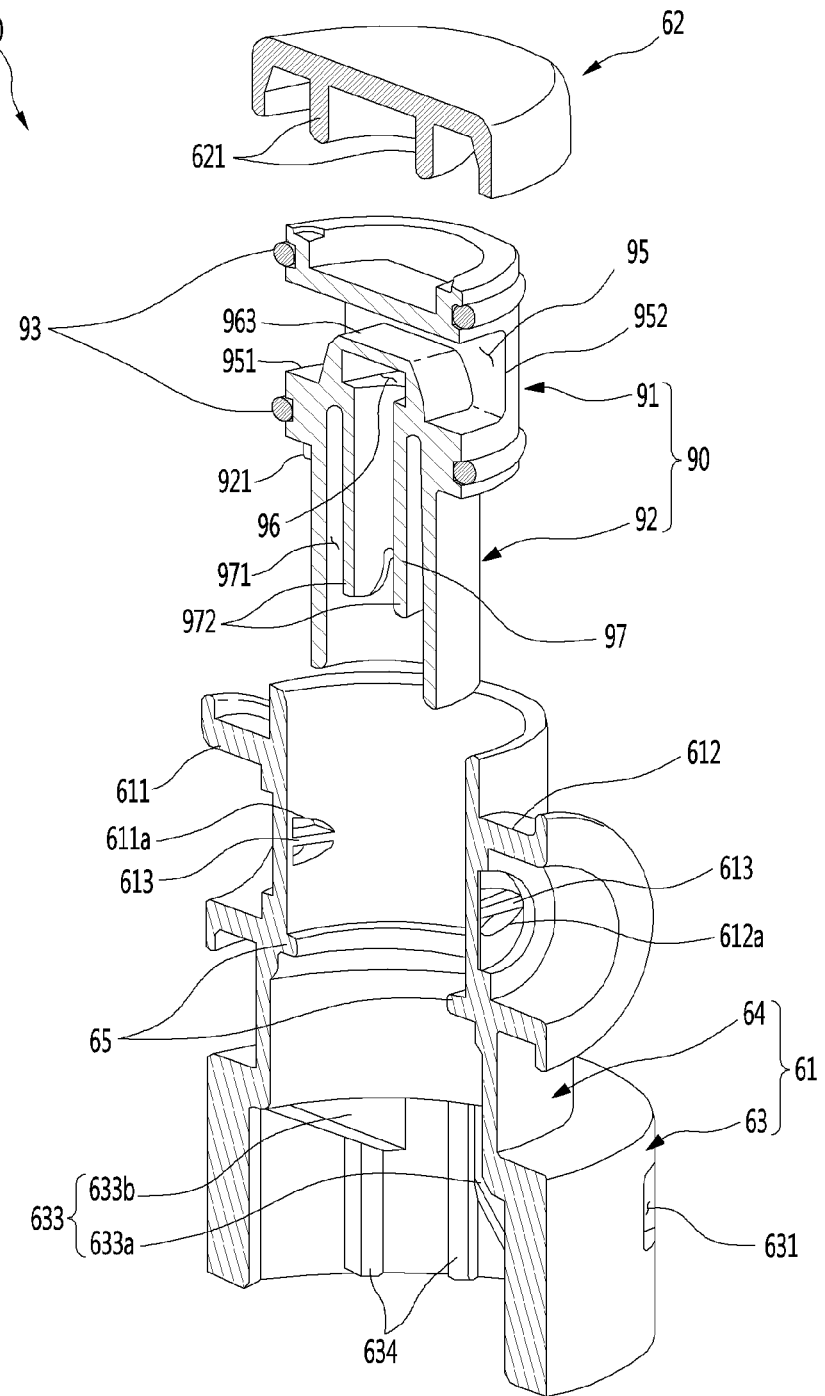
FIG. 15 is a cutaway exploded perspective view illustrating an internal structure of the head viewed from one side according to an embodiment of the invention.
Figure 16:
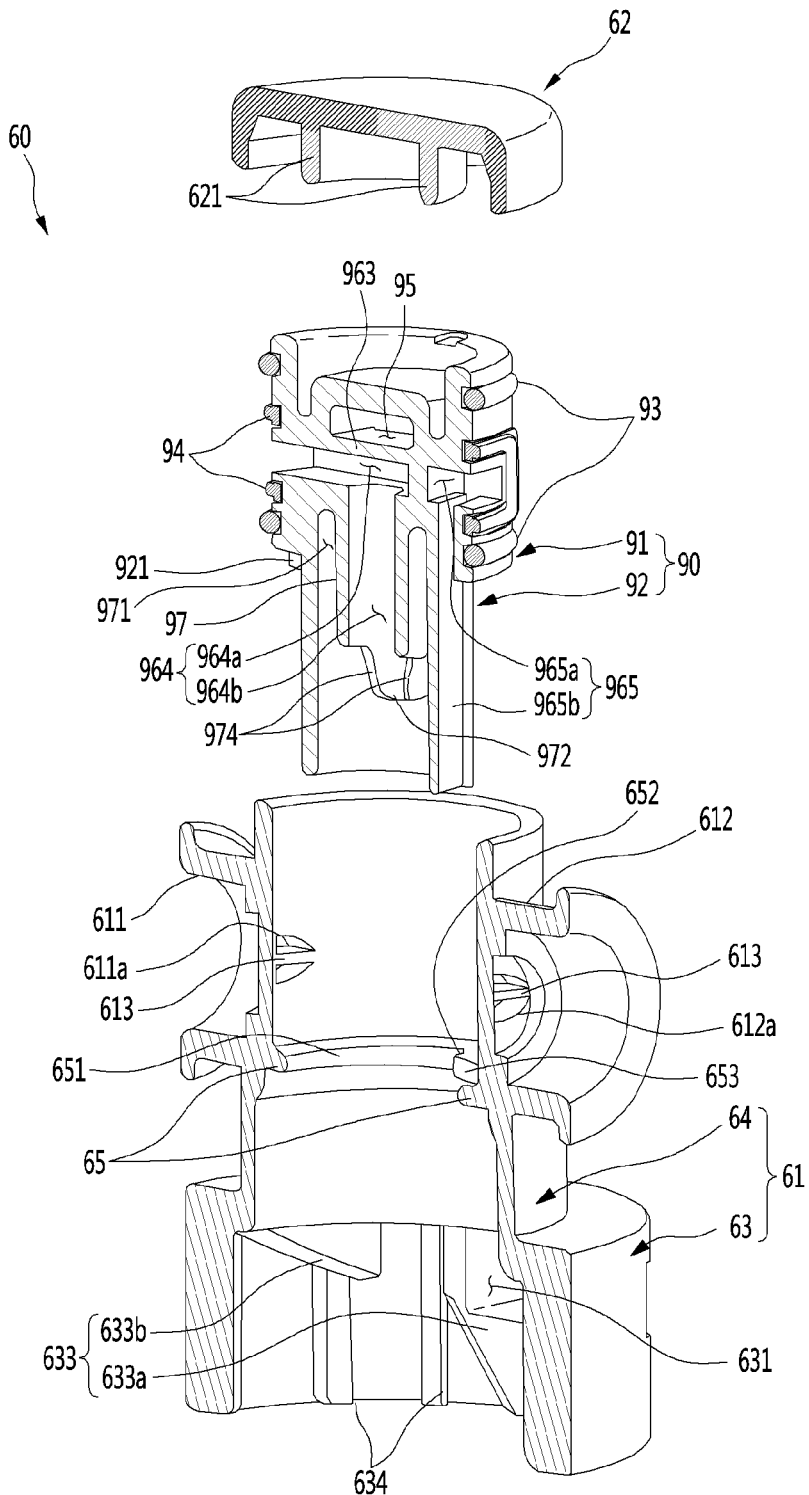
FIG. 16 is a cutaway exploded perspective view illustrating the internal structure of the head viewed from the other side according to an embodiment of the invention.

FIG. 15 is a cutaway exploded perspective view illustrating an internal structure of the head viewed from one side according to an embodiment of the invention. FIG. 16 is a cutaway exploded perspective view illustrating the internal structure of the head viewed from the other side.

FIG. 15 illustrates a longitudinal section in a state where the bypass flow path 95 is switched to be connected to the water inlet portion 611 and the water outlet portion 612. As shown, a bypass flow path 95 passing through the center of the upper part 91 may be formed on the upper part 91, and the bypass inlet port 951 and the bypass outlet port 952 may be formed on both sides of the circumference of the upper part 91, respectively.

The bypass inlet port 951 and the bypass outlet port 952 may be larger than the sizes of the water inlet port 611a and the water outlet port 612a, and may be positioned between a pair of shaft O-rings which are vertically disposed. Therefore, the water passing through the bypass flow path 95 in a state where the bypass flow path 95 is aligned with the water inlet portion 611 and the water outlet portion 612 does not leak to the outside and passes across the head 60.

In other words, water introducing into the head 60 passes through the head 60 without passing through the filter 40, and even in a state where the filter 40 is separated, water does not leak from a side on which the filter 40 is mounted and can be continuously supplied to the water supplying flow path 30.

On the other hand, a flow path projecting portion 963 which projects for forming the filtering flow path 96 (described in more detail below) is formed on the inner surface of the bypass flow path 95. The flow path projecting portion 963 may be formed at the center of the inside portion of the shaft 90 and project from the bottom of the bypass flow path 95 but may be formed not to shield the bypass flow path 95.

Both ends of the flow path projecting portion 963 may be inclined or rounded so that a decrease in the flow velocity caused by the flow path projecting portion 963 can be minimized when water flows through the bypass flow path 95.

FIG. 16 illustrates a longitudinal section in a state where the filtering flow path is shifted to be connected with the water inlet portion and the water outlet portion. As shown, the filtering flow path 96 may be connected to the water inlet portion 611 and the water outlet portion 612 according to the rotation of the shaft 90.

At this time, the shaft inlet port 961 and the shaft outlet port 962 are in contact with the water inlet port 611a and the water outlet port 612a, respectively. and the outsides of the shaft inlet port 961 and the shaft outlet port 962 and the outsides of the water inlet port 611a and the water outlet port 612a are capable of being fully sealed by the sealing member 94. An inner pipe 97 may be formed on the inside of the lower part 92, and the inner pipe 97 can be connected to the supporter extending portion 85.

Accordingly, the water which flows into through the shaft 90 can be supplied to the inside portion of the filter 40 through the upper supporter 80 and discharged to the shaft 90 through the upper supporter 80 after the water is purified by the filtering member 44. In other words, the water which flows into the head 60 can be purified through the filter 40 and then discharged through the head 60.

On the other hand, the filtering flow path 96 may include a shaft water inlet flow path 964 and a shaft water outlet flow path 965.

The shaft water inlet flow path 964 may include a horizontal portion 964a that extends from the shaft inlet port 961 to the center of the shaft 90 and a vertical portion 964b that extends from an end portion of the vertical portion 964a in the lower direction. The vertical portion 964b may be formed by the inner pipe 97.

The outer surface of the inner pipe 97 may be spaced apart from the inner surface of the lower part 92 to form a spacing space 971. The distance of the spacing space 971 may correspond to the thickness of the supporter extending portion 85. Therefore, when the filter 40 is mounted, the upper end of the supporter extending portion 85 can be inserted into an inside of the spacing space 971.

The length of the inner pipe 97 in the vertical direction may be shorter than the length of the outer surface of the lower part 92 in the vertical direction. The inner pipe 97 and the supporter extending portion 85 may be connected together on the inner surface of the lower part 92. To this end, a second connecting portion 972 may be formed on the lower end of the inner pipe 97.

The second connecting portion 972 may have a shape corresponding to the first connecting portion 851. The second connecting portion 972 may be inserted into the first connecting portion 851 so that the shaft 90 and the upper supporter 80 can be rotated together.

The shaft water inlet flow path 964 may communicate with the filter inlet flow path 871. The water for purification can be supplied to the filtering member 44 by the coupling together the inner pipe 97 and the supporter extending portion 85.

The shaft water outlet flow path 965 may include an water outlet guide portion 965b formed on an outer surface of the lower part 92, and an water outlet connecting portion 965a formed on the upper part 91.

The upper end of the water outlet guide portion 965b may pass through the lower surface of the upper part 91 and then communicate with the water outlet connecting portion 965a. The water outlet connecting portion 965a may connect the water outlet guide portion 965b and the shaft outlet port 962 at the inside of the upper part 91.

Accordingly, the purified water which is discharged from the filter outlet port 862 can move along the water guide portion 965b in the upper direction and be discharged to the shaft outlet port 962 through the water outlet connecting portion 965a. The purified water which is discharged to the shaft outlet port 962 may be discharged through the water outlet portion 612.

Accordingly, for example, in a state where the filtering flow path 96 is connected to the water inlet portion 611 and the water outlet portion 612, the water which flows into the head 60 through the water inlet pipe 301 is supplied into the inside portion of the filter 40 and then is capable of being purified, and may flow again from the filter 40 to the head 60 and be discharged to the water outlet pipe 302.

On the other hand, the body seating portion 65 may be formed on the inner circumferential surface of the upper body 64. The lower surface of the upper part 91 may be seated on the body seating portion 65 when the shaft 90 is mounted.

Figure 17:
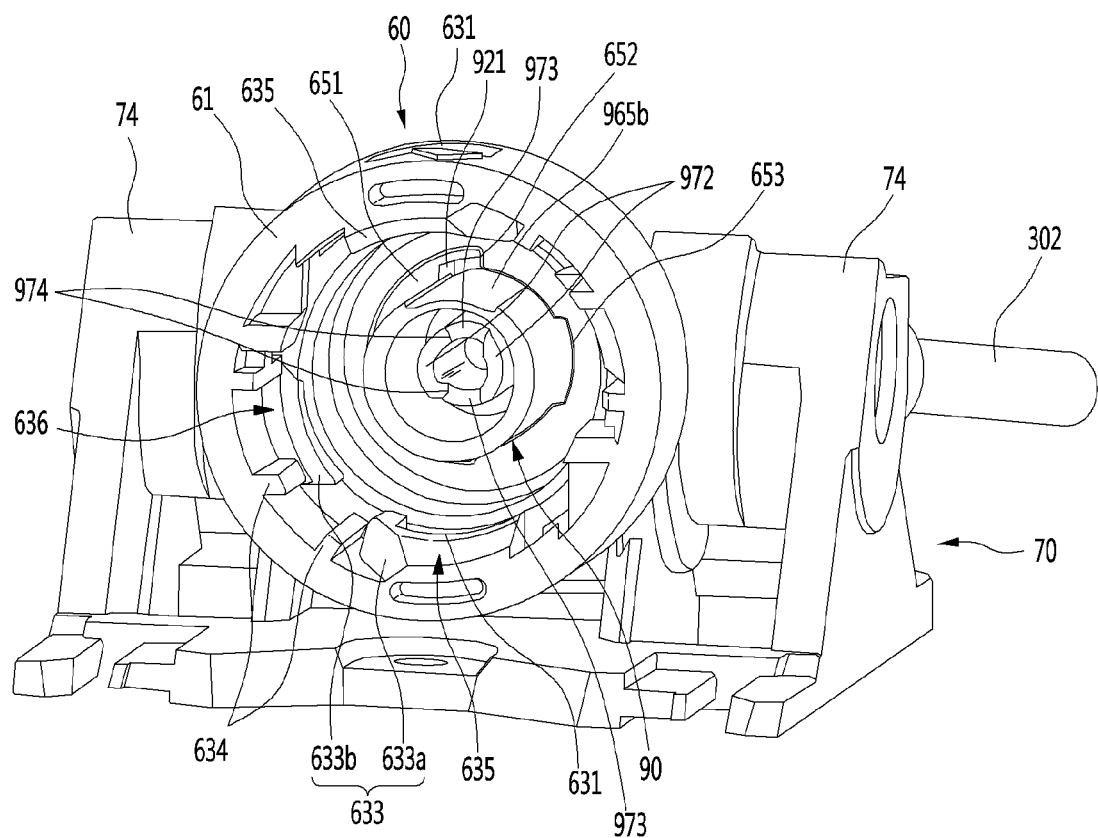
FIG. 17 is a perspective view illustrating the head viewed from the lower side according to an embodiment of the invention.
Figure 18:
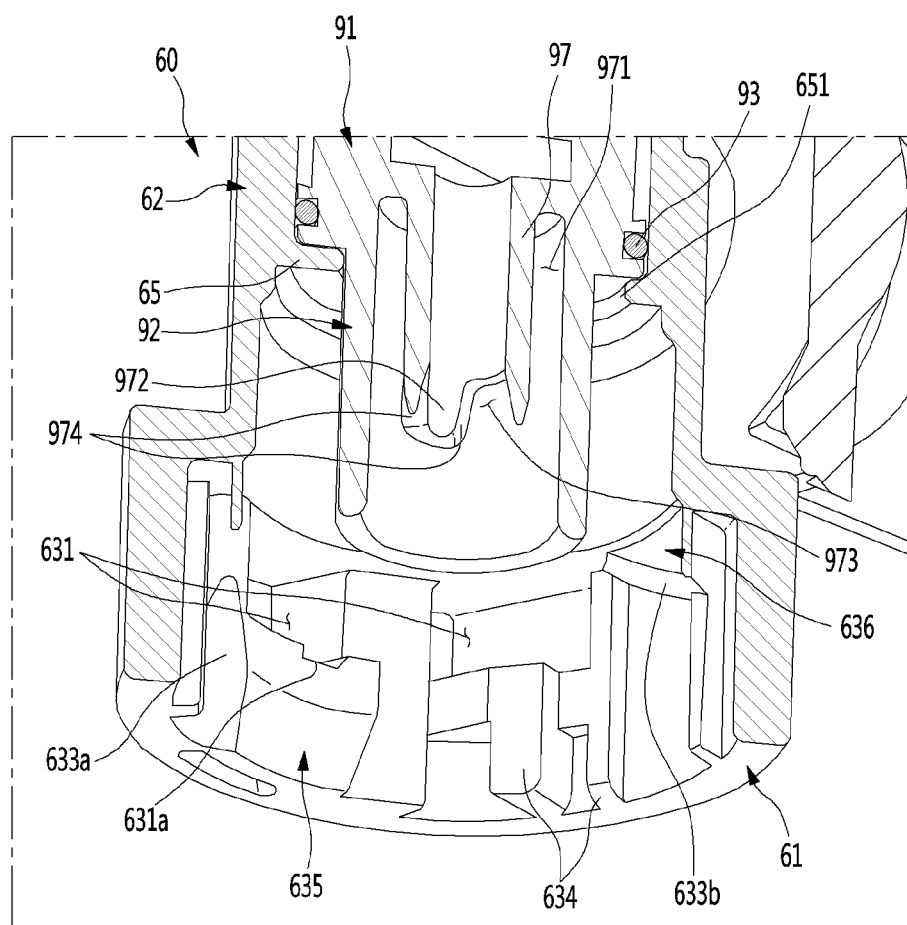
FIG. 18 is a partially cutaway perspective view illustrating the head according to an embodiment of the invention.

FIG. 17 is a perspective view illustrating the head viewed from below according to an embodiment of the invention. FIG. 18 is a partially cutaway perspective view illustrating the head.

With reference to FIGS. 15-18, a rotating guide 651 may be formed on the body seating portion 65. The rotating projection 921 may be positioned on an inside of the rotating guide 651. The rotating guide 651 may be formed on the body by cutting the body at an angle of 180 degrees with respect to the center of the head body 61. However, it is not limited thereto.

Since a pair of rotating projections 921 are disposed at an angle of 90 degrees, in a case where the shaft 90 may be rotated by the angle of 90 degrees, the rotating projections 921 is capable of being stopped by stoppers 652 which are formed on both ends of the rotating guide 651.

The water inlet portion 611 and the water outlet portion 612 may be selectively connected to the filtering flow path 96 or the bypass flow path 95 at a position which is stopped by the stopper 652. Therefore, when the user rotates the filter 40 to a point where the filter 40 is no longer rotated in one direction even without rotating the filter 40, the flow path is capable of being selected and accurately connected.

A flow path cutout portion 653 may be formed on one side of the body seating portion 65. The flow path cutout portion 653 may be formed on the seating portion 65 in a position facing the rotating guide 651 and may be formed on the lower side of the water outlet port 612*a* in the vertical direction.

Therefore, the flow path cutout portion 653 may be disposed at a position which is the same as that of the water outlet guide portion 965*b* in a state where the shaft 90 is rotated so that the filtering flow path 96 is connected to the water inlet portion 611 and the water outlet portion 612. The flow path cutout portion 653 may have the same (or substantially the same) width as the water outlet guide portion 965*b*. Therefore, the water outlet guide portion 965*b* and the flow path cutout portion 653 can be in contact with each other to form a flow path through which the purified water is capable of flowing in the upper direction.

On the other hand, a pair of the coupling grooves 631 and a plurality of the supporting ribs 634 may be formed on the inner surface of the lower body 63. When the filter 40 is mounted on the head 60 and then rotated so that the filtering flow path 96 is connected to the water inlet portion 611 and the water outlet portion 612, the coupling projection 433 can be inserted into the coupling groove 631.

The coupling groove 631 may be exposed to the outside portion through the opening portion 632, and the coupling state of the restraining projection 433*b* and the restraining groove 631*a* can be checked through the opening portion 632. The position of the restraining groove 631*a* may be formed at a position in which the restraining projection 433*b* and the restraining groove 631*a* may be engaged to be restrained with each other in a state where the coupling projection 433 is fully rotated. Therefore, in a state where the filter 40 is inserted into the inside of the head 60 and then fully rotated, the coupling projection 433 is capable of being restrained in the inside of the coupling groove 631 and thus random separation of the filter can be prevented.

On the other hand, the coupling groove 631 may be formed by a first guide projecting portion 635 which projects from the inner surface of the lower body 63. The restraining groove 631*a* may be formed on the upper surface of the first guide projecting portion 635. The first guide projecting portion 635 may be formed from the opened end of the lower body 63 to the coupling groove 631 and provide a surface on which the coupling projection 433 can be seated.

Therefore, when the filter 40 is inserted into the head 60, the coupling projection 433 cannot be inserted into some sections of the opening of the lower surface of the head 60 due to the interference of the first guide projecting portion 635. The coupling projection 433 can be inserted through the section which is not interfered with the first guide projecting portion 635, so that the filter 40 can be prevented from being erroneously mounted.

A first groove guide portion 633*a* for guiding the coupling projection 433 to the entrance of the adjacent coupling groove 631 may be formed on one side surface of the first guide projecting portion 635. The first groove guide portion 633*a* may have a predetermined inclination and be in contact with the projection guide portion 433*a* of the coupling projection 433 and thus guide the rotational movement of the coupling projection 433 in one direction when the coupling projection 433 is inserted.

A second guide projecting portion 636 may be formed on one side which is spaced apart from the end portion of the first groove guide portion 633*a* along the inner surface of the lower body 63 by a predetermined distance. A second groove guide portion 633*b* may be inclined on the second guide projecting portion 636 so that the coupling projection 433 which passes by the first groove guide portion 633*a* moves along the second groove guide portion 633*b* so as to be guided and moved to the entrance of the coupling groove 631. The second groove guide portion 633*b* may extend from one side away from the first groove guide portion 633*a* to the entrance of the coupling groove 631.

Therefore, when the filter 40 is inserted into the opened lower surface of the lower body 63 after the coupling projection 433 is positioned at a position corresponding to the inserting display portion 613 when the filter 40 is mounted, the projection guide portion 433*a* slides along the first groove guide portion 633*a* and then slides along the second groove guide portion 633*b* and is inserted into the inside of the coupling groove 631.

In a case where the user inserts the coupling projection 433 of the filter 40 by aligning the coupling projection 433 in a process of the filter 40 being inserted into the inside of the head 60, the filter 40 can be coupled while being smoothly rotated by the first groove guide portion 633*a* and the second groove guide portion 633*b*.

The shaft 90 and the upper supporter 80 are integrally coupled together in a state where the filter 40 is fully inserted and then the coupling projection 433 is positioned at the entrance of the coupling groove 631. When the filter 40 is further rotated so that the coupling projection 433 is fully inserted into the inside of the coupling groove 631, the shaft 90 is rotated together with the filter 40 and the filtering flow path 96 is rotated to be connected to the water inlet portion 611 and the water outlet portion 612.

To this end, a second connecting portion 972 may be formed at the lower end of the shaft 90, that is, at the lower end of the inner pipe 97. A pair of second connecting portions 972 may have the same shape at a position which faces each other, and both sides of the lower end of the inner pipe 97 may be formed by a cutting operation. However, it is not limited thereto.

Specifically, the lower end of the inner pipe 97 may include the pair of second connecting portions 972 and a pair of pipe cutout portions 973 formed between the second connecting portions 972. The pair of second connecting portions 972 may have a width which is gradually narrowed in the lower direction.

A second inclined surface 974 may be formed at both side ends of the pair of second connecting portions 972 and the second inclined surface 974 may be formed to have an inclination corresponding to the first inclined surface 853.

The second inclined surface 974 may be inserted along the first inclined surface 853 in a process of the filter 40 being rotatably inserted into the head 60. When the filter 40 is fully inserted into the head 60, the second connecting portion 972 may be matched with the first connecting portion 851 and the projecting portion 852 may be matched with the pipe cutoff portion 973. Therefore, the first inclined surface 853 and the second inclined surface 974 can be in close contact with each other.

In addition, the second inclined surface 974 may be inclined in the direction of rotation of the filter 40 as the first inclined surface 853. Therefore, when the filter 40 is further rotated in a state where the rotation of the shaft 90 is restricted by the stopper 652, the force in the rotating direction is acted to the second inclined surface 974 and the first inclined surface 853 and the first inclined surface 853 moves along the second inclined surface 974 so that the filter 40 can be more easily separated.

On the other hand, a plurality of the supporting ribs 634 may be formed on the inner surface of the lower body 63, and the outer surface of the filter inserting portion 431 can be supported by the supporting ribs 634.

Hereinafter, the operation of the water purifying apparatus according to an embodiment of the invention having the structure described above is described.

Figure 19:
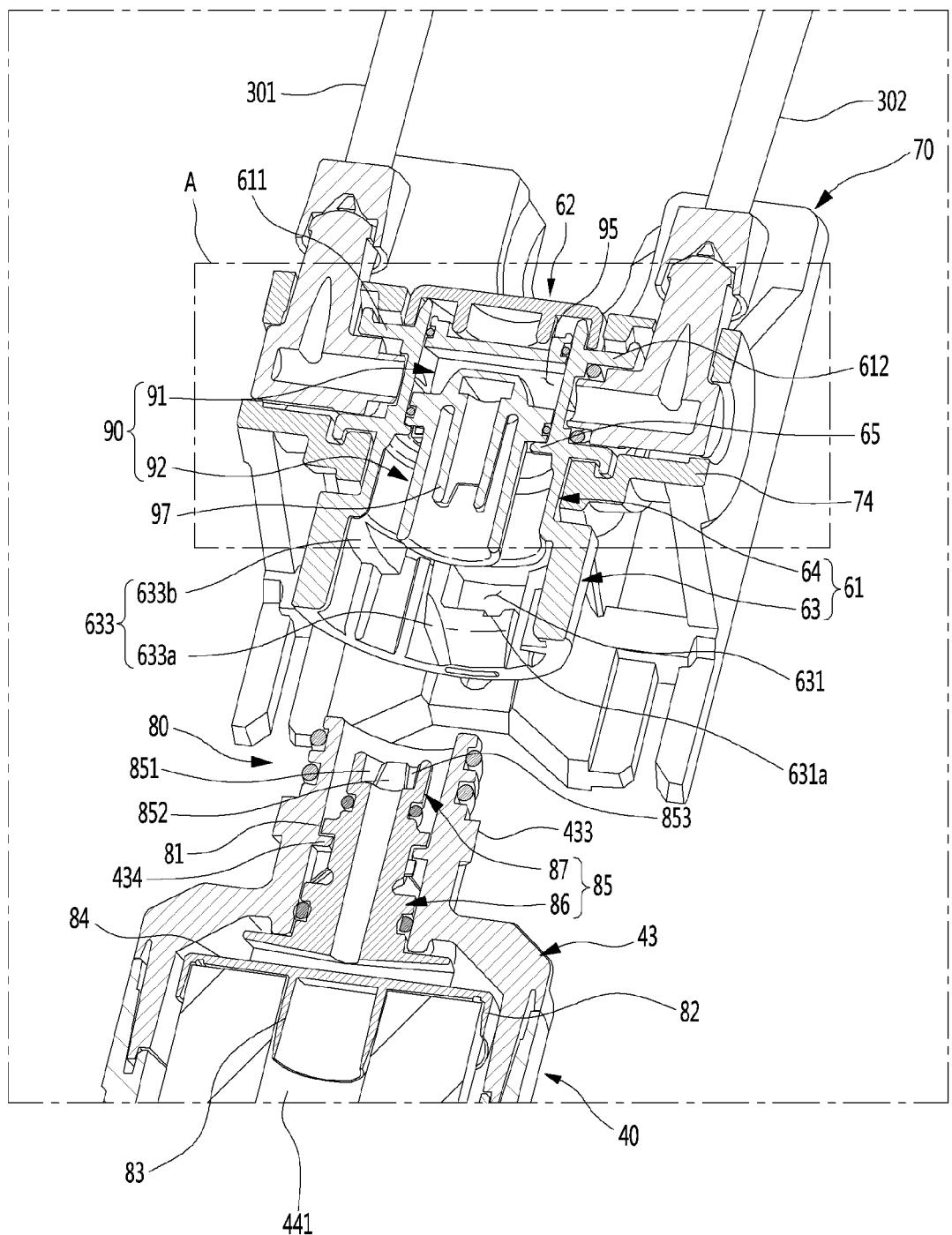
FIG. 19 is a cutaway perspective view illustrating a state where the filter and the head are separated from each other according to an embodiment of the invention.
Figure 20:
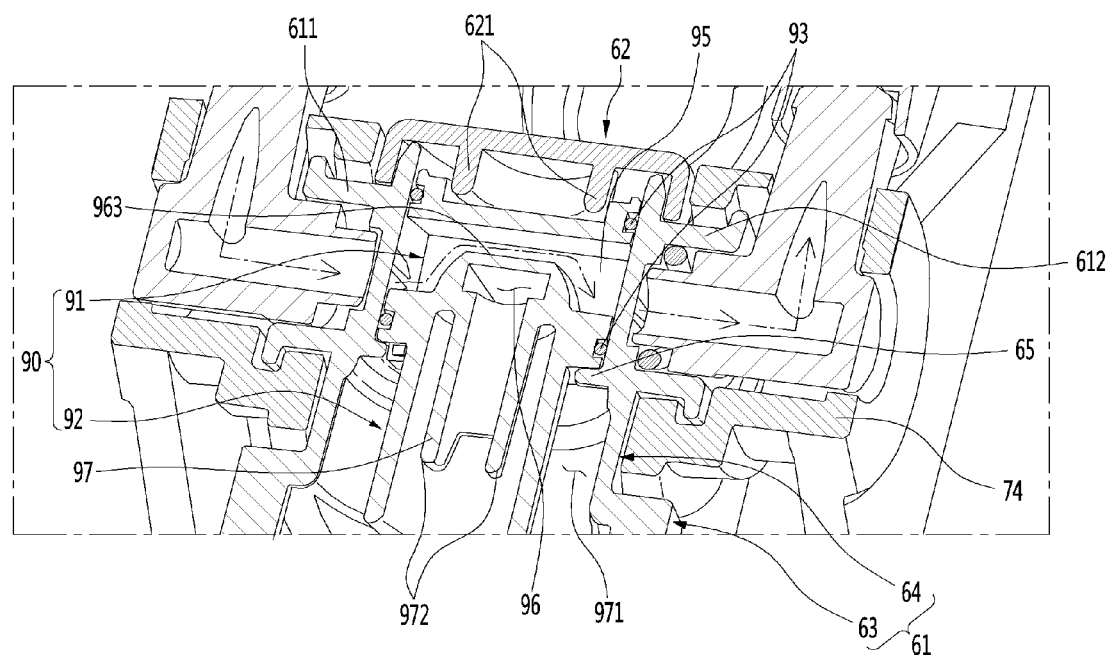
FIG. 20 is an enlarged view of portion A of FIG. 19.
Figure 21:
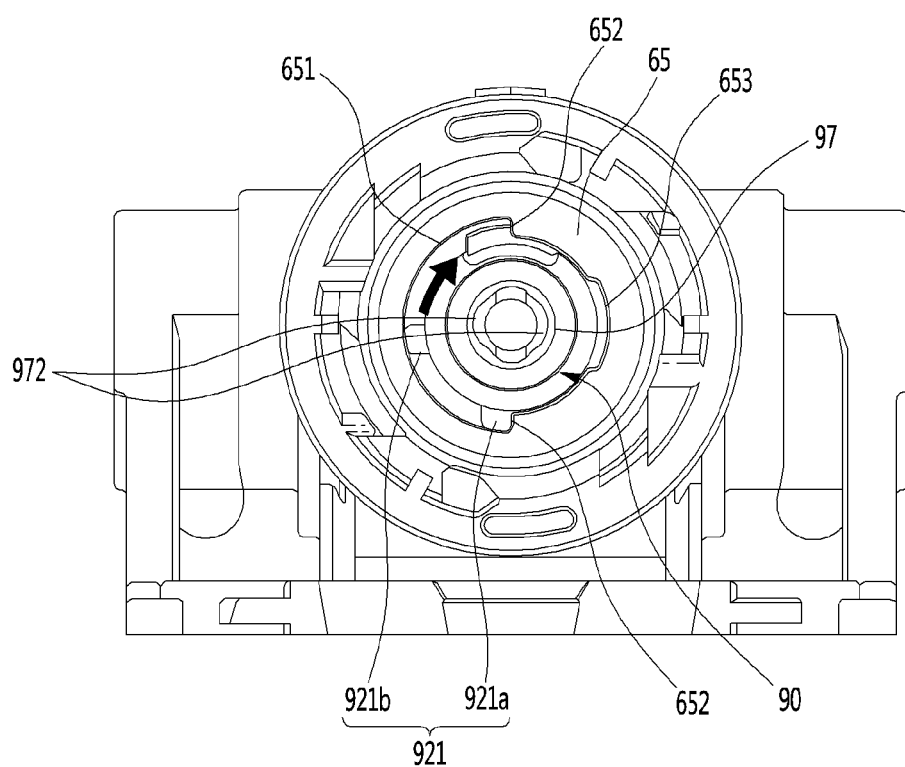
FIG. 21 is a view illustrating a shaft position in a state where the filter and the head are separated from each other according to an embodiment of the invention.

FIG. 19 is a cutaway perspective view illustrating a state where of the filter and the head are separated from each other according to an embodiment of the invention. FIG. 20 is an enlarged view of portion A of FIG. 19, and FIG. 21 is a view illustrating a shaft position in a state where the filter and the head are separated from each other.

As illustrated in the drawings, the bypass flow path 95 may be connected to the water inlet portion 611 and the water outlet portion 612 in a state where the filter 40 is not coupled to the head 60.

Therefore, the water which flows into through the water inlet portion 611 flows into the bypass inlet port 951 through the water inlet port 611a and flows along the bypass flow path 95. The water is discharged to the water outlet portion 612 through the bypass outlet port 952 and the water outlet port 612a. In other words, the water which flows into the water inlet portion 611 passes through the head 60 without being subjected to a purification process, and is supplied directly to the ice maker 24 or the dispenser 23 through the water supplying flow path 30.

Such a state may correspond to a state where the filter 40 is separated for replacement of the filter 40, or may correspond to a situation where the service which is related to the cleaning of a pipeline or other maintenance is performed. In addition, even in a case where at least a portion of the plurality of filters 40 are not used, or where purification of water is not required, it is capable of corresponding to such a state. Moreover, even in a case where the filter 40 is fully separated, no problem occurs in use of the refrigerator 1.

On the other hand, with reference to FIG. 21, when the disposition of the shaft 90 is described in a state where the filter 40 is not mounted, the first rotating projection 921a of the pair of rotating projections 921 is in a state of being in contact with the stopper 652 of one side of the rotating guide 651. In this state, the water outlet guide portion 965b and the flow path cutout portion 653 are maintained a state of being shifted by an angle of about 90 degrees with each other.

Figure 22:
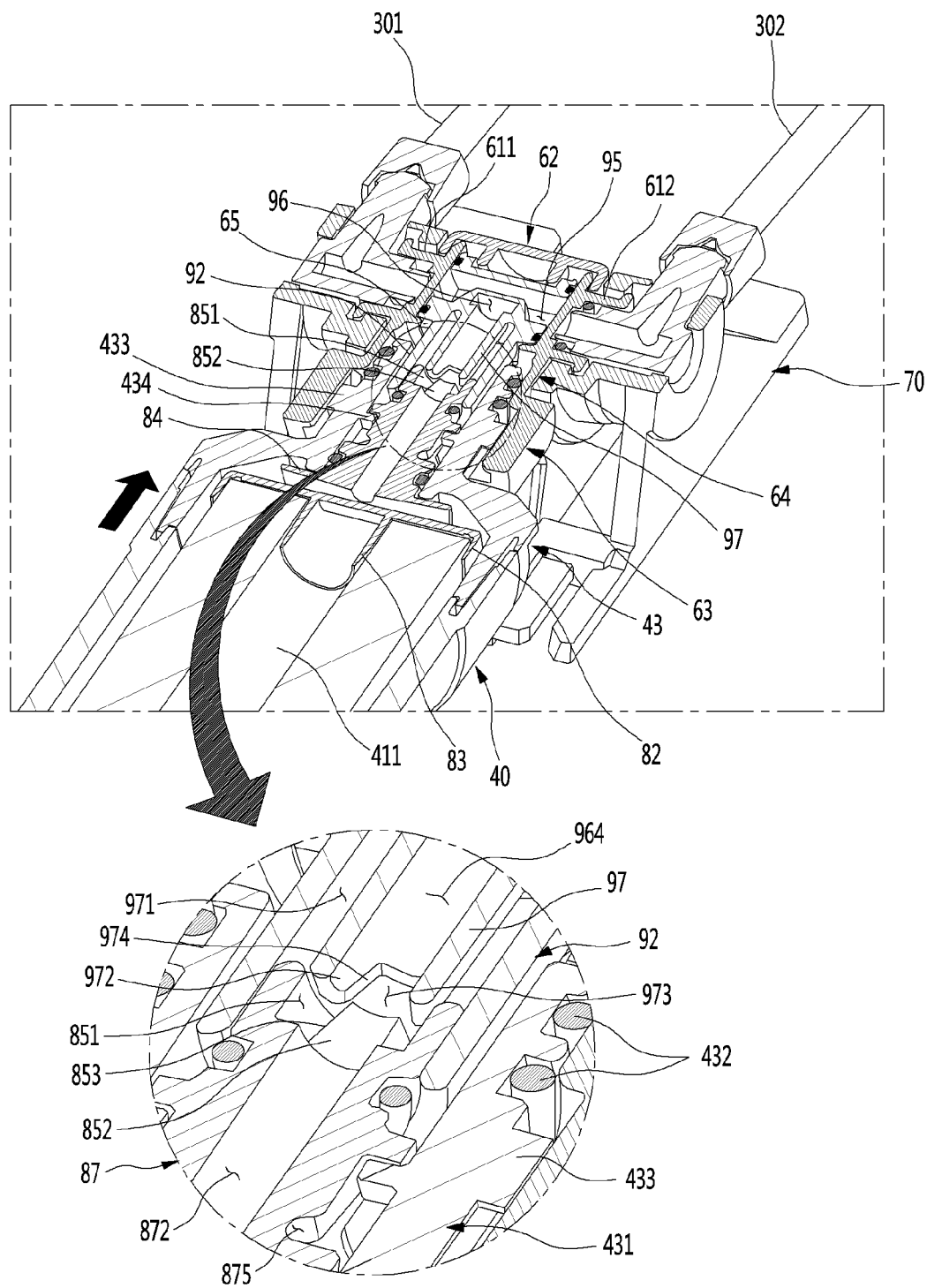
FIG. 22 is a view illustrating a state where the filter is inserted into an inside of the head according to an embodiment of the invention.
Figure 23:
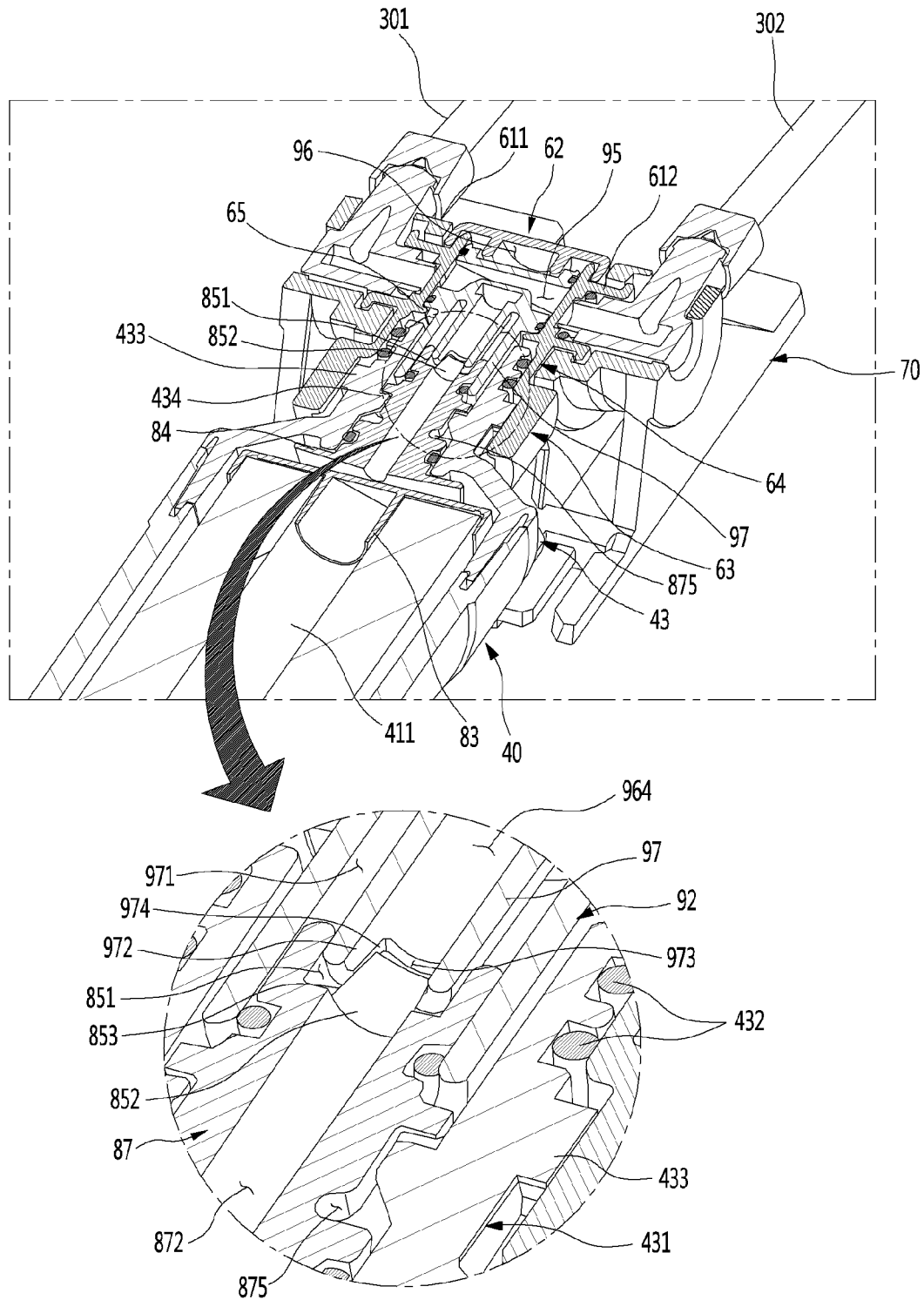
FIG. 23 is a view illustrating a state where the filter is fully inserted into the inside of the head according to an embodiment of the invention.

FIG. 22 is a view illustrating a state where the filter is inserted into an inside of the head according to an embodiment of the invention. FIG. 23 is a view illustrating a state where the filter is fully inserted into the inside of the head.

As illustrated in the drawings, the filter inserting portion 431 is inserted into the opening of the lower surface of the head 60 to mount the filter 40. At this time, the position of the coupling projection 433 is capable of being aligned and inserted by referring to the inserting display portion 613 formed on the outside of the head 60.

The coupling projection 433 slides along the first groove guide 633a and the second groove guide 633b in a process of the insertion of the filter 40. Accordingly, the filter 40 can be smoothly rotated along with insertion.

When the filter 40 is inserted by a predetermined depth, the insertion of the second connecting portion 972 into the inside of the first connecting portion 851 proceeds, as illustrated in FIG. 21. At this time, the second connecting portion 972 and the first connecting portion 851 are capable of being slid while the second inclined surface 974 and the first inclined surface 853 are in contact with each other, respectively. Accordingly, the second connecting portion 972 may be guided to the inside of the first connecting portion 851.

In other words, when the filter 40 is inserted and mounted, the filter 40 is smoothly rotated in the process of inserting the filter 40 into the head 60 by the first groove guide 633a and the second groove guide 633b. The shaft 90 and the supporter extending portion 85 can be fully matched by sliding the second inclined surface 974 and the first inclined surface 853 in the process of rotation, as illustrated in FIG. 23.

As illustrated in FIG. 23, the coupling projections 433 may be located on the inner side or the entrance side of the coupling grooves 631 in a case where the shaft 90 and the supporter extending portion 85 are fully matched with each other. In other words, the filter 40 corresponds to a state where the filter 40 is simply inserted before the filter 40 is fully coupled with the head. In this state, the shaft 90 is not rotated, and the bypass flow path 95 is in a state of being connected to the water inlet portion 611 and the water outlet portion 612.

Moreover, in the state illustrated in FIG. 23, the user is capable of further rotating the filter 40 in the rotation advancing direction and is rotated by about 90 degrees so that the coupling projection 433 is fully inserted into the inside of the coupling groove 631.

Figure 24:
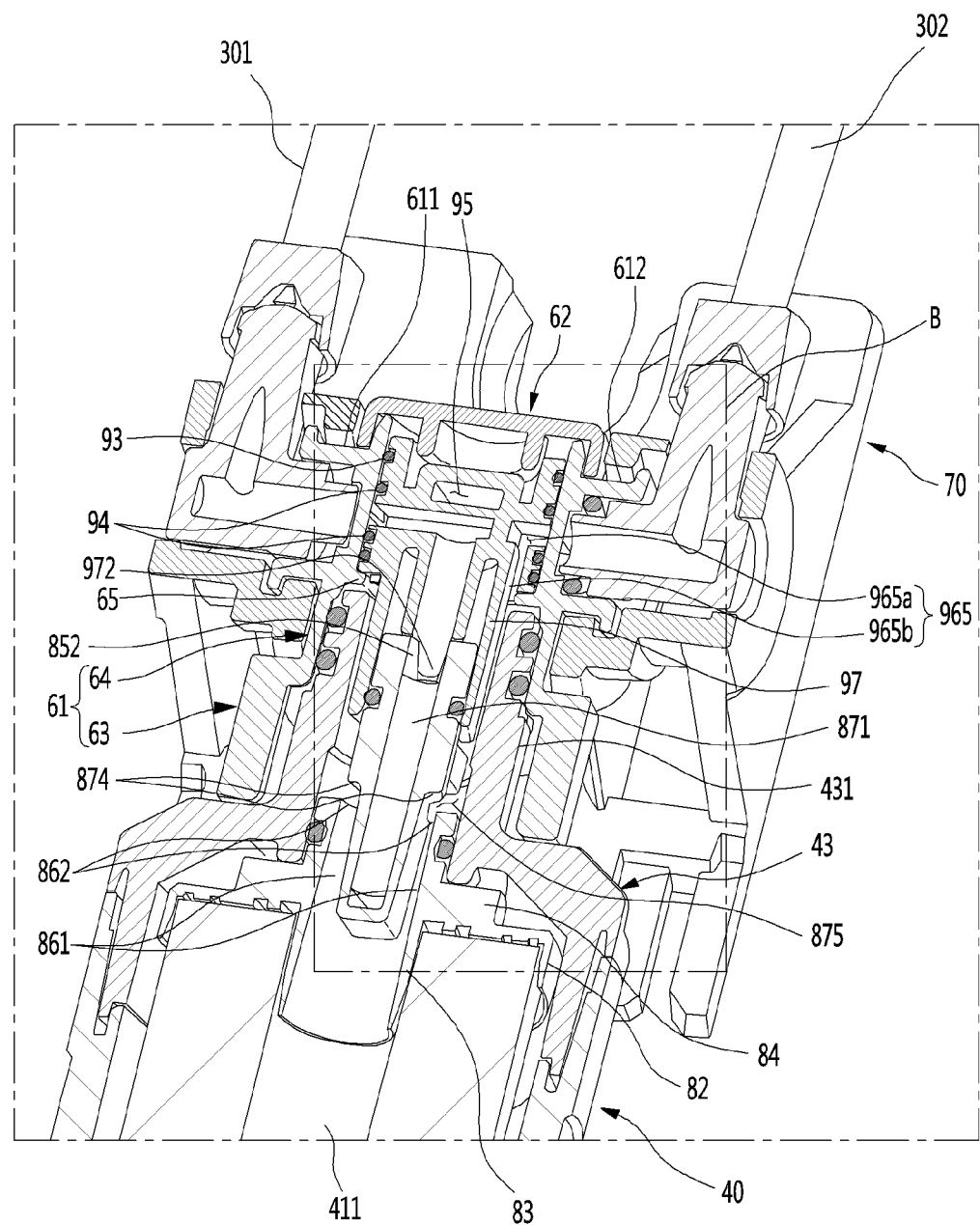
FIG. 24 is a view illustrating a state where the filter is rotated for coupling in a state where the filter is fully inserted into the inside of the head according to an embodiment of the invention.
Figure 25:
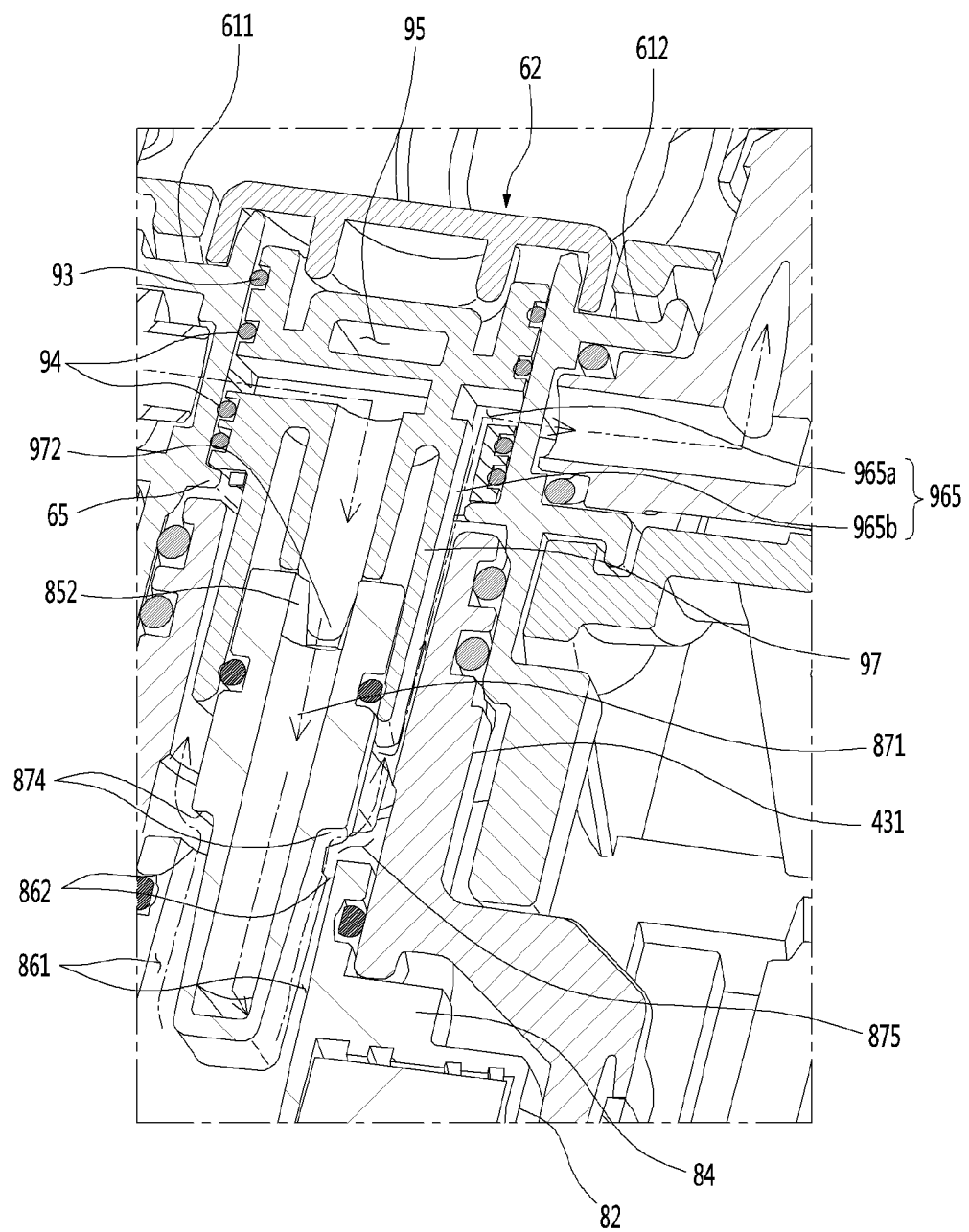
FIG. 25 is an enlarged view of portion B in FIG. 24.

FIG. 24 is a view illustrating a state where the filter is rotated for coupling in a state where the filter is fully inserted into the inside of the head according to an embodiment of the invention. FIG. 25 is an enlarged view of portion B in FIG. 24, and FIG. 26 is a view illustrating a shaft position in a state where the filter is coupled to the head.

Figure 26:
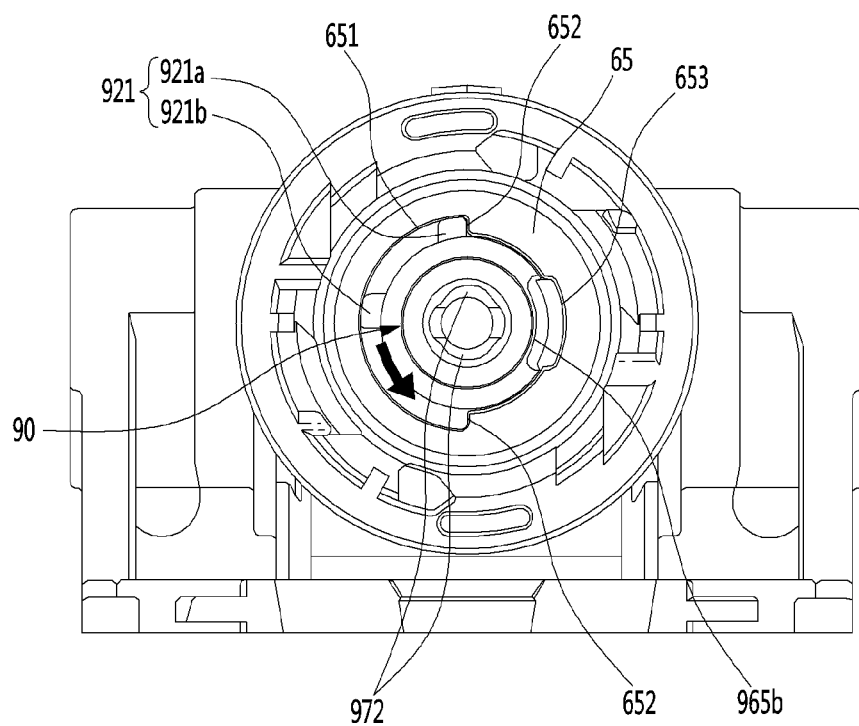
FIG. 26 is a view illustrating a shaft position in a state where the filter is coupled to the head according to an embodiment of the invention.

In a state of being illustrated in FIG. 23, when the filter 40 is further rotated by an angle of 90 degrees so that the coupling projection 433 and the coupling groove 631 are rotated to be fully coupled with each other, the shaft 90 is also rotated along with the rotation of the filter and thus is in a state of being illustrated in FIG. 26.

Specifically, when the filter 40 is rotated in a state where the second connecting portion 972 is inserted into the first connecting portion 851 and thus fully coupled together, the shaft 90 rotates along with the filter 40.

The shaft 90 may be further rotated by an angle of about 90 degrees until the second rotating projection 921b reaches the position of the stopper 652. When the shaft 90 is fully rotated, the filtering flow path 96 is connected to the water inlet portion 611 and the water outlet portion 612. Of course, the inner pipe 97 and the supporter extending portion 85 maintains a connected state with each other and thus the original water and the purified water is capable of flowing in and out between the head 60 and the filter 40. In addition, the coupling projection 433 is in a state of being fully inserted into and thus is coupled with the coupling groove 631 and the filter 40 is operated to be rotated in a direction which is opposite to the coupling direction by the user and thus the filter 40 is maintained in a state of coupling with the head 40 until the filter 40 is separated from the head 60.

Moreover, in the state illustrated in FIG. 24, the water flowing in through the water inlet portion 611 flows along the shaft water inlet flow path 964 through the water inlet port 611a and the shaft inlet port 961. In other words, water flowing along the horizontal portion 964a and the vertical portion 964b passes by the inner pipe 97, flows into the inside of the supporter extending portion 85 and flows along the first filter inlet flow path 872 in the lower direction. Then, water is branched by the second filter inlet flow path 873 and flows into the space between the inner surface of the housing 41 and the filtering member 44.

The water flowing into the hollow 441 of the inside of the filtering member 44 from the outside of the filtering member 44 may be purified in the process of passing through the filtering member 44. The purified water of the inside of the filtering member 44 flows along the inside of the first extending portion 86 in the upper direction and is discharged from the filter outlet port 862 which is disposed on both sides of the upper end of the first extending portion 86 in the upper direction.

At this time, a space in which water purified by the outer surface of the first extending portion 86 and the lower part 92 inserted into the inside of the filter inserting portion 431 flows to the head 60 side may be formed in the inside of the filter inserting portion 431. On the other hand, as illustrated in FIG. 24, in a state where the filtering flow path 96 is connected to the water inlet portion 611 and the water outlet portion 612, the water outlet guide portion 965b and the flow path cutout portion 653 are positioned at the same position with each other and thus the purified water is capable of flowing to the upper part 91 side.

Accordingly, the purified water flows along the water outlet guide portion 965b formed in the lower part 92 in the upper direction and flows into the inside of the upper part 91 and thus passes through the shaft outlet port 962 and the water outlet portion 612 in this order, and then is discharged to the water outlet portion 612. The water outlet pipe 302 of the water outlet portion 612 forms a portion of the water supplying flow path 30 to supply the purified water to the dispenser 23 and the ice maker 24.

Moreover, in the state illustrated in FIG. 23, in a state where the filter 40 should be removed because of reach of period of replacement of the filter 40 or other maintenance, the filter 40 is first rotated in a direction which is opposite to the coupling direction.

The coupling projection 433 may be moved in a direction away from the coupling groove 631 according to the rotation of the filter 40 and the supporter extending portion 85 rotates the shaft 90. As illustrated in FIG. 20, when the filtering flow path 96 is closed by the shaft 90 being rotated by 90 degrees and then the bypass flow path 95 is connected, the rotating projection 921 contacts the stopper 652 and thus is restricted the rotation of the shaft 90.

In this state, when a force is applied to further rotate the filter 40, the shaft 90 cannot be further rotated based on interference with the stopper 652. Accordingly, a torsion moment is applied to the first inclined surface 853 and the second inclined surface 974 so that the second inclined surface 974 is smoothly separated along the first inclined surface 853 while being slid. Further, the coupling projection 433 which is escaped from the coupling groove 631 passes by the second groove guide portion 633b and the first groove guide portion 633a in this order to allow the filter 40 to be separated from the head 60.

In the disclosed embodiments of the invention, so as to facilitate the understanding of the invention, as an example, the water purifying apparatus 17 is described as being mounted on the refrigerator 1. However, it is understood that the water purifying apparatus 17 described herein can likewise be applied to the water purifier which is generally used and the entire device which is capable of purifying water by a filter exchanging manner.

The water purifying apparatus according to the disclosed embodiments and the refrigerator including the water purifying apparatus have at least the following effects.

According to the disclosed embodiments of the invention, in a case where the filter is separated from the head for replacement or maintenance of the filter, the bypass flow path connects to the water inlet portion and the water outlet portion so that the flow path is capable of being connected without generating leakage. Since the water supplying flow path is capable of being maintained in a connected state by the bypass flow path, continuous supply of water to the dispenser or the ice maker becomes possible, and service work such as the cleaning of the flow path becomes possible. Therefore, convenience of use of the water purifying apparatus is improved.

In addition, according to the disclosed embodiments of the invention, the filtration flow path is connected to the water inlet portion and the water outlet portion during the rotation operation for mounting the filter, so that purified water is capable of being supplied. When rotation for the separation of the filter is operated, the bypass flow path is connected to the water inlet portion and the water outlet portion so that water is capable of being continuously supplied even at the removal of the filter. In other words, the flow path can be switched without additional operation by the rotation operation of mounting and separating the filter. Thus, convenience of use of the water purifying apparatus is further improved.

In addition, according to the disclosed embodiments of the invention, the exact position is capable of being displayed on the head into which the filter is inserted so that the filter is capable of being mounted accurately. In addition, since a groove guide which is in contact with the coupling projection is formed at the inside of the head so as to be inclined, the filter is capable of being smoothly rotated and thus inserted into the coupling groove only by inserting the filter at an exact position. In addition, since the flow paths of the head and the filter are capable of being connected at the same time by the coupling of the coupling projections with the coupling grooves. Thus, convenience of use of the water purifying apparatus is further improved.

In addition, according to the disclosed embodiments of the invention, the first connecting portion and the second connecting portion which are formed at the ends of the shaft and the upper supporter have a structure which are matched with each other and have an inclination in the axial direction and thus when the filter is inserted into the head, since the inclinations are in contact with each other, the filter is guided to be inserted in the exact position. In addition, when the filter is rotated to separate the filter, the inclined surfaces of the first connecting portion and the second connecting portion are capable of being easily separated from each other in a section in which the rotation of the shaft is restricted. Thus, convenience of use of the water purifying apparatus is further improved.

In addition, according to the disclosed embodiments of the invention, since the flow path is capable of switching by only the rotation of the shaft without a separate valve structure and an elastic member for switching the flow path, the configuration of the product is capable of being simplified. Thus, productivity can be improved and manufacturing cost can be reduced.

In addition, according to the disclosed embodiments of the invention, malfunction of the water purifying apparatus is prevented or substantially minimized due to a less complex operation structure, reliability of the water purifying apparatus is assured, and the durability of the water purifying apparatus is improved.

In addition, according to the disclosed embodiments of the invention, since a portion of the filtering flow path projects to the inside of the bypass flow path, so that the structure of the shaft is capable of being made compact. Thus, the capacity loss of the refrigerator when the water purifying apparatus is installed in the refrigerator can be minimized by the size of the head on which the shaft is mounted, and the water purifying apparatus can have a more compact structure.

The foregoing description is merely illustrative of the technical idea of the present invention and various changes and modifications may be made without departing from the essential characteristics of the present invention by those having ordinary skill in the art to which the present invention belongs. Therefore, the embodiments disclosed in the present invention are intended to illustrate rather than limit the scope of the present invention, and the scope of the technical idea of the present invention is not limited by these embodiments.

What is claimed is:

1. A filter assembly, comprising:
   a filter member;
   a housing body having an accommodating space formed therein to accommodate at least a portion of the filter member;
   a housing cap coupled to an upper portion of the housing body, the housing cap comprising an upper side and a lower side,
   wherein a diameter of the upper side is smaller than a diameter of the lower side, and a channel formed through the upper side and the lower side;
   a coupling projection projecting outwardly from an outer surface of the housing cap;
   an upper supporter accommodated in the channel, the upper supporter having a first filter inlet flow path to allow water to flow into the filter member; and
   a first connecting portion recessed inwardly from an inner circumferential surface of an upper end of the upper supporter, and
   a pair of projecting portions disposed symmetrically and extending from the first connecting portion.

2. The filter assembly of claim 1, wherein each of the projecting portions gradually narrows in an upward direction, and a first inclined surface is formed at the first connecting portion from both sides of each of the projecting portions.

3. The filter assembly of claim 2, further comprising:
   a head comprising a water inlet portion to receive water and a water outlet portion through which purified water is discharged and the head is detachably coupled to the housing cap, and
   a shaft having a filter flow path to discharge the water introduced into the water inlet portion to the water outlet portion via the filter member.

4. The filter assembly of claim 3, wherein the shaft comprises an inner pipe that is at least partially accommodated in the upper end of the upper supporter, the inner pipe being rotatably connected to the upper supporter.

5. The filter assembly of claim 4, further comprising a pair of second connecting portions, each of the second connecting portions disposed on a lower end of the inner pipe and projecting downward and accommodated in the first connecting portion.

6. The filter assembly of claim 5, further comprising a pair of cutoff portions recessed upward to accommodate the pair of projection portions, the pair of cutoff portions being disposed on the lower end of the inner pipe.

7. The filter assembly of claim 6, wherein each of the second connecting portions gradually narrows in a downward direction, and a second inclined surface having an inclination corresponding to that of the first inclined surface is disposed on both sides of each of the second connecting portions.

* * * * *